United States Patent
Papa et al.

(10) Patent No.: US 11,743,763 B2
(45) Date of Patent: *Aug. 29, 2023

(54) CONGESTION AND OVERLOAD REDUCTION

(71) Applicant: Parallel Wireless, Inc., Nashua, NH (US)

(72) Inventors: Steven Paul Papa, Windham, NH (US); Rajesh Kumar Mishra, Westford, MA (US); Kartik Shashikant Raval, Pune (IN); Kaitki Agarwal, Westford, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/131,710

(22) Filed: Dec. 22, 2020

(65) Prior Publication Data

US 2021/0112444 A1   Apr. 15, 2021

Related U.S. Application Data

(63) Continuation of application No. 15/900,615, filed on Feb. 20, 2018, now Pat. No. 10,893,436, which is a continuation of application No. 14/822,839, filed on Aug. 10, 2015, now Pat. No. 9,900,801.

(60) Provisional application No. 62/035,361, filed on Aug. 8, 2014.

(51) Int. Cl.
*H04W 28/02* (2009.01)
*H04W 76/18* (2018.01)
*H04W 76/16* (2018.01)

(52) U.S. Cl.
CPC ... *H04W 28/0289* (2013.01); *H04W 28/0247* (2013.01); *H04W 76/16* (2018.02); *H04W 76/18* (2018.02)

(58) Field of Classification Search
None
See application file for complete search history.

(56) References Cited

U.S. PATENT DOCUMENTS

| | | | | |
|---|---|---|---|---|
| 9,900,801 | B2* | 2/2018 | Papa | H04W 28/0247 |
| 10,893,436 | B2* | 1/2021 | Papa | H04W 28/0289 |
| 2012/0069737 | A1* | 3/2012 | Vikberg | H04W 28/12 370/232 |
| 2014/0347990 | A1* | 11/2014 | Chimbili | H04W 76/00 370/235 |
| 2016/0286434 | A1 | 9/2016 | Noldus | |

* cited by examiner

*Primary Examiner* — Saad Khawar
(74) *Attorney, Agent, or Firm* — Michael Y. Saji; David W. Rouille

(57) ABSTRACT

A gateway server situated between a radio access network and a core network is disclosed that includes a radio access network packet interface, a load management module for monitoring load of a management server in the core network coupled to the radio access network packet interface, a packet forwarding module for forwarding requests to the management server coupled to the load management module, and a local packet core module coupled to the load management module and the packet forwarding module, the local packet core module being configured to respond to a mobile device, when an overload is detected at the management server, with a management server message requesting that the mobile device try again at a later time.

19 Claims, 16 Drawing Sheets

CONGESTION AND OVERLOAD REDUCTION

CROSS-REFERENCE TO RELATED APPLICATIONS

This application is a continuation of, and claims the benefit under 35 U.S.C. § 120 of, U.S. patent application Ser. No. 15/900,615, filed Feb. 20, 2018 and entitled "Congestion and Overload Reduction," which itself is a continuation of, and claims the benefit under 35 U.S.C. § 120 of, U.S. patent application Ser. No. 14/822,839, filed Aug. 10, 2015 and entitled "Congestion and Overload Reduction," which itself claims the benefit of priority under 35 U.S.C. § 119(e) of U.S. Provisional Patent Application No. 62/035,361, having filed Aug. 8, 2014, and entitled "Method for Congestion and Overload Control of MME," each of which are hereby incorporated by reference herein in their entirety for all purposes. In addition, this application incorporates each the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; U.S. patent application Ser. No. 14/183,176, entitled "Methods of Incorporating an Ad Hoc Cellular Network into a Fixed Cellular Network," filed Feb. 18, 2014; and U.S. patent application Ser. No. 14/571,250, entitled "Virtualization of the Evolved Packet Core to Create a Local EPC," filed on Dec. 15, 2014.

BACKGROUND

Traditional telecommunications service networks separate the systems used for signaling and user data. This separation is intended to create redundancy and fault tolerance to data throughput constraints. However, with the growth of Long Term Evolution (LTE) networks, there have been many discussions and papers written about signaling storms. Signaling storms, as used herein, are events during which heavy traffic significantly reduces the signaling capacity of a network; they differ from ordinary network congestion in that it is limited signaling capacity, not limited data capacity, that is the constraint.

Why is signaling load growing to such an extent? One reason is the flatter architecture of LTE networks as compared with 3G networks. In 3G networks, the Radio Network Controller (RNC) resides between the base station and core network elements, effectively shielding the core network from the mass of signaling generated by the radio access network for mobility management. Because LTE uses a flat architecture, it eliminates the RNC. The core network is connected directly to the LTE base stations, in LTE, which means that it has to handle all signaling traffic. All networks having a flat architecture are, to some extent, vulnerable to signaling overload in this way.

A corollary is that the failure of one element in the core network can have consequences for a large number of base stations and UEs. For example, a single home subscriber server (HSS) may provide identity services for all subscribers on the network, and may provide these services to hundreds of eNodeBs. As another example, a single mobility management entity (MME) can provide mobility management also for hundreds of eNodeBs. The failure of an MME can cause hundreds of mobile devices to become unable to access the network.

If a single HSS or MME fails, the consequences may include a signaling storm, as all eNodeBs and/or UEs connected to that HSS or MME may attempt to reconnect to another core network node at the same time, causing a spike in traffic similar to a denial-of-service attack.

SUMMARY

A number of solutions are disclosed herein for mitigating congestion and overload.

In one embodiment, a gateway server situated between a radio access network and a core network is disclosed that includes a radio access network packet interface, a load management module for monitoring load of a management server in the core network coupled to the radio access network packet interface, a packet forwarding module for forwarding requests to the management server coupled to the load management module, and a local packet core module coupled to the load management module and the packet forwarding module, the local packet core module being configured to respond to a mobile device, when an overload is detected at the management server, with a management server message requesting that the mobile device try again at a later time.

In another embodiment, a method is disclosed, including determining, at a gateway situated on a communications path between a core network and a radio access network, a load state for a management server in the core network based on a count of messages received during a first interval at the gateway; entering, at the gateway, a throttle mode based on the load state; receiving, at a gateway situated between a core network and a radio access network, a request from a mobile device for a management server in the core network; throttling the request based on the throttle mode; monitoring, at the gateway, the load state of the management server; and exiting the throttle mode when the load state of the management server returns to a normal load during a second interval.

The request may be an attach request from a user equipment (UE) to connect to a mobility management entity (MME) in a long term evolution (LTE) core network, and the management server may be the MME. Entering the throttle mode when the load state exceeds a threshold set based on a line rate of a communications channel between the gateway and the core network or processing throughput estimate at the management server may be disclosed. Entering or exiting the throttle mode upon receiving a S1AP overload control message from the management server may be disclosed. The count of messages may be an overall received message count from the radio access network of messages that are being sent to the management server. The count of messages may be a count of success messages from the management server to the radio access network. Throttling may further comprise sending, to the mobile device, a rejection message and a backoff request. The backoff request may further comprise a suggested backoff time, and wherein the rejection message and the backoff request further comprise source identification information of the management server.

Determining whether to drop, provide service to, or provide degraded service to the request may be disclosed. Determining whether to send a mobile device to another radio access network node or radio access technology may be disclosed. Receiving, at the gateway, requests from a plurality of radio access network nodes for the management server may be disclosed. The radio access network may provide radio access according to 2G, 3G, 4G, or 5G protocols. The method may include receiving authentication information from a security server in the core network, caching the authentication information, and authenticating the mobile device prior to forwarding the request to the management server. Entering the throttle mode may be based on the load state and a priority of the request. Entering the throttle mode may be based on the load state and a source equipment identifier of the mobile device in the request. The source equipment identifier may be either an international mobile subscriber identity (IMSI) or international mobile equipment identifier (IMEI) on a priority equipment list or in a range of priority equipment identifiers. Entering the throttle mode may be based on the load state and a roaming status of the mobile device. Providing, at the gateway, a backhaul connection to an external network not through the core network for the mobile device based on a priority or a mobile equipment identifier may be disclosed. Providing the backhaul connection using selected IP traffic offload (SIPTO) or local IP access (LIPA) may be disclosed.

DETAILED DESCRIPTION

Figure 1:
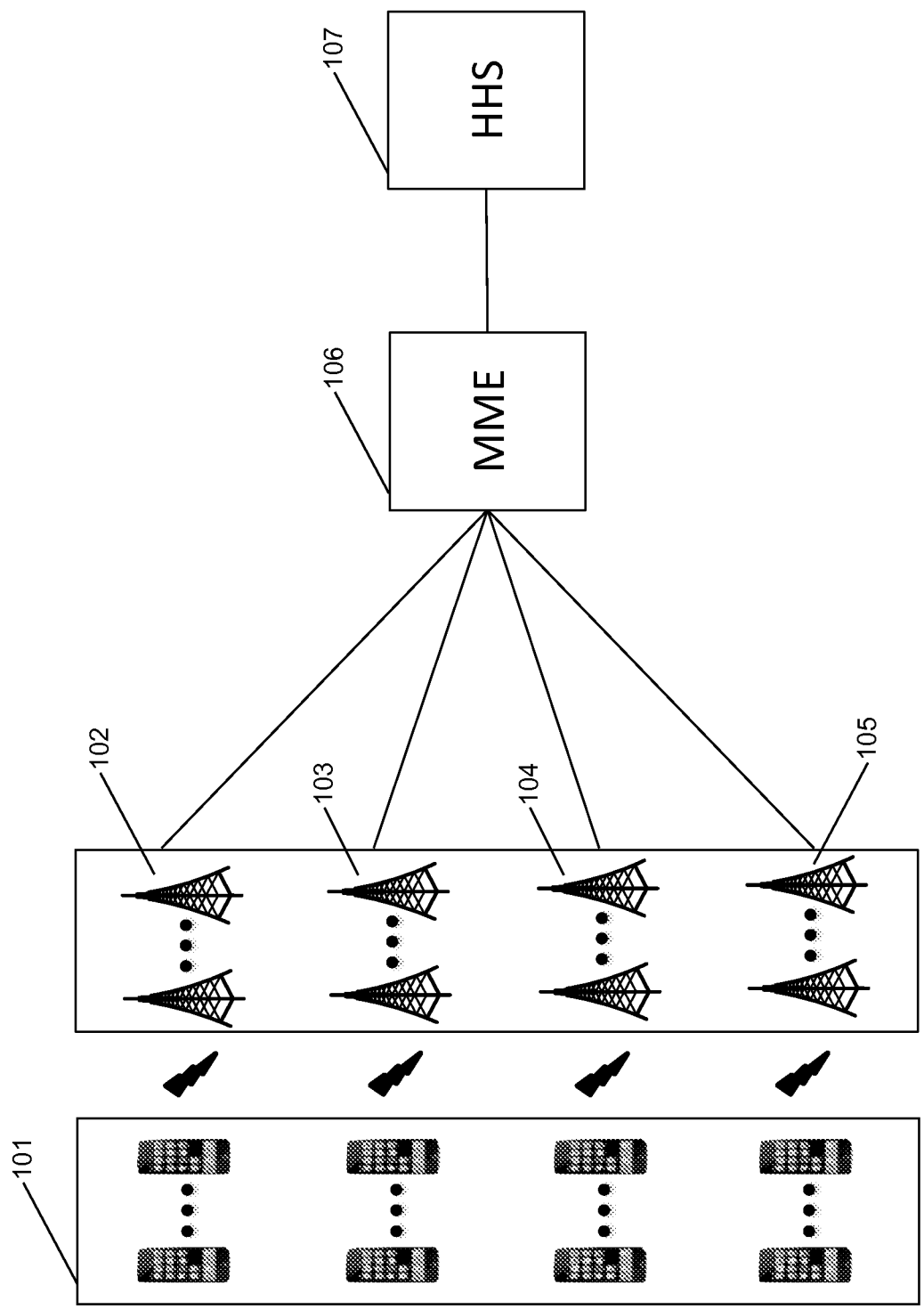
FIG. 1 is a schematic diagram illustrating a signaling storm in an operator network.

1. Service Request Throttling per UE (Throttle, Deny, Pass Through)

In a first embodiment, service request throttling may be performed on a per-UE basis. In this approach, the rate of service requests from the UE are measured and based on a core network-configured threshold, and new requests from the UE are denied if the threshold is exceeded. In the LTE scenario, it is difficult to differentiate between service request types (control or data) to apply policies based on same. Typically, an operator is willing to give higher priority to avoiding signaling storm outages at the expense of user experience. In some embodiments, a signaling concentrator node is positioned between eNodeB and MMES, thereby solving the signaling storm problem at the edge of the network as opposed to on the back-end or in the core of the network.

2. UE Disallowed Service at eNodeB, not in CN

In a second embodiment, service request throttling may be performed at the radio access network (RAN) itself, such as at an eNodeB, a NodeB, or a Wi-Fi access point, including at a multi-radio access technology (multi-RAT) access node. In this approach, a UE can be disallowed service at the eNodeB itself if the number of service requests or IDLE/CONNECTED transactions exceed a certain threshold.

3. Rogue UE, RN, eNodeB Detection

In a third embodiment, detection of rogue user equipment (UE), relay node (RN), and eNodeB nodes may be provided, and once a rogue device is detected, the network may disallow the related attachment connection request. Detection of rogue UE can be based on pattern matching and/or deep packet inspection (DPI) heuristics/signatures/rules, which may be detected at a network node in the core network and which may be published by the operational support system (OSS). For example, the signature can be that of a certain specific application, e.g., the Facebook app, implemented on a certain particular device, such as, for example, the Apple iPhone 5S. In this embodiment, received signals from the suspected rogue UE could be compared to signature signals that are known to be authentic signals and signatures that are known to be rogue signals. Within a network, RANs may share information about signals that are known to be authentic or rogue with the computing cloud so that it can store this information in a centralized location.

4. MOCN Signaling Concentrator; per-CN Security Behavior Based on per-CN OSS

In a fourth embodiment, one signaling concentrator node can be used to serve multiple EPC cores, and hence core networks, in parallel. With the same signaling behavior, the signaling concentrator node could take different actions accordingly (throttle, deny or pass-through) based on the associated OSS tied with the particular EPC core.

5. Multi-Signaling Concentrator Correlated Joint Response

In a fifth embodiment, when there is a plurality of signaling concentrator nodes deployed and these nodes communicate with each other, they may cooperate. In this scenario, when one of the nodes has identified an ongoing malicious DDOS attack, it may signal other nodes in the region so that the other signaling concentrators can intensify their signaling storm action like throttling even though the signaling DDOS attack has not started on those sites.

6. Per-UE Signaling Priority.

In a sixth embodiment, once a signaling storm is detected, another action the network can take is prioritization. For example, heavy signaling load can be generated from UEs used by police, UEs used by the normal people and UEs tied with the machine. A signaling concentrator acting as a proxy can assign different priority and schedule higher priority signaling traffic accordingly during the signaling storm.

In some embodiments, the same or similar techniques, methods, architectures, and systems may be used to provide signaling storm reduction for 2G, 3G (including 3GPP and 3GPP2 technologies), and 5G technologies, in addition to and in conjunction with reduction for 4G and LTE technologies. 2G, 3G, and 5G technologies all have certain commonalities, such as handsets with IMSI, IMEI or other hardware, software, user or group identifiers, that can be used in conjunction with the techniques described herein. In some embodiments, the techniques described herein could be applied to communications networks that include Wi-Fi gateways, such as ePDG, HRPD, or TWAG gateways, in communication with a centralized mobility server or authorization server, such as enterprise-managed telephone networks. In some embodiments, the techniques described herein could be applied to communications networks that include pico cells, femto cells, small cells, or other cellular base stations that are operated at a lower radio power and for fewer users than a macro cell.

In some embodiments, the techniques described herein could be applied to communications networks that include cells on wheels (COWs) and other temporary cellular installations, or other mobile or vehicle-mounted base stations, such as those described in U.S. Pat. No. 8,867,418, which is hereby incorporated by reference in its entirety; in fact, such temporary and mobile cellular nodes may have additional utility in the event of an emergency, and would be well-suited to be used together with the techniques described herein.

An example of a typical signaling storm scenario follows. Today it is common for many users to receive the same notification at once, such as a notification from Facebook that an update or message is available. If a large number of users are sent the same notification, the notification originates on a server on the Internet and is sent to a core network server via a packet gateway, such as an LTE PGW. The core network server then must identify the target user and find the user on the network, even if the user's UE is turned off. The core network may initiate tens or hundreds of paging requests to find these UEs, which may overload the network. Next, in the common situation that the UEs are not already attached with an active data session, each UE may initiate an attach request and request a data bearer, which, given enough users, may result in a signaling storm at the core network that exceeds the maximum signaling throughput or maximum processing throughput of the network, or both. A scale factor also similarly multiplies the load on a network-wide resource, such as an HSS, that is provisioned for typical load conditions and not for extreme burst load conditions.

Given that a single eNodeB may be overwhelmed by a large number of requests, the corresponding upstream MME will be subject to a scale factor of the cumulative requests from several eNodeBs, and may also be likely to fail when handling all of these requests. In today's networks, failure modes of MMES and other network nodes are unpredictable, and may result in partially-completed attach protocols, a "zombie" attach that does not permit the attached user to receive or send data, or even complete non-responsiveness. Other users, including users that are already attached, may also experience non-responsiveness, delay, or involuntary detach.

In some embodiments, signaling messages may be received, aggregated, and concentrated by filtering at a signaling concentrator network node, as described further herein. The signaling concentrator network node may process the signaling messages at a rate sufficient to handle the messages it receives. One measure of signaling message throughput is the line rate. The line rate, sometimes defined as the physical layer net bit rate or effective data rate, is the number of bits that physically pass through the physical layer connection, minus bits used for error-correcting codes in some definitions. When a signaling storm occurs, the signaling throughput can approach this maximum physical layer rate. However, since the signaling throughput cannot exceed this rate, signaling storms can be handled by provisioning a system that can handle messages at or near this rate.

In some embodiments, provisioning a signaling concentrator for signaling storms may be performed by adding together the backhaul line rates of each eNodeB or base station coupled to the signaling concentrator, and providing compute resources sufficient to handle signaling messages received at or approaching the theoretical line rate. The signaling concentrator may use the mobile device identifier to apply a scheduling profile, which can indicate whether a given message should be passed on to the core network, delayed, provided with degraded service, or dropped. Although the signaling concentrators may additionally use any of the methods and techniques described herein, this subset of functionality is sufficient to enable the line rate processing of signaling, thereby avoiding signaling storms.

In some embodiments, if a single concentrator is not sufficient, multiple concentrators may be provided in a distributed network of signaling concentrators, each processing its own signaling messages. The load may be divided by source base station, physical RAN connection, or by mobile device identifier (e.g., IMSI), or by time slice, or by any other method. In the event that multiple concentrators are used, each may have its own cache of mobile device identifier scheduling profiles, which may be assumed to be updated only when there is no active signaling storm. Scheduling profiles may be created at another network node and distributed to the signaling concentrator nodes.

In other embodiments, if the signaling traffic at line rate is projected to exceed the capacity of one or more signaling concentrators, a queue may be put into place where the size of the queue is equal to the line rate of the underlying base stations, multiplied by the projected duration of a signaling storm or disaster outage. The queue can help ensure that signaling messages are not dropped for the length of the projected duration, and can reduce the effective line rate, thereby enabling a network operator to reduce the required hardware for the signaling concentrator.

In some embodiments, local evolved packet core (local EPC) or local core network functionality may be provided, either at the signaling concentrator node or at the eNodeBs themselves. In the event of a signaling storm, it is possible that a node may lose its connectivity to the core network. Indeed, it is possible that a natural disaster or other emergency situation may be the cause of the signaling storm, which also may affect the availability of the core network. Therefore, a local EPC may be provided.

The local EPC enables certain functionality to be performed according to the techniques described herein, without requiring access to the core network. Specifically, the local EPC may cache authentication and policy information from one or more core network HSS servers, OSS servers, or AAA servers. Many of the techniques described within require mobile device identifier profiles. The local EPC may download these profiles from the abovementioned core network servers. The local EPC may also download and cache core network authentication credentials for some or all mobile device identifiers (e.g., IMSI), so that when a mobile device connects to the network, it is able to authenticate and attach even without core network connectivity at attach time. In some embodiments, mobile devices that fail to authenticate with the cached credentials in the absence of connectivity to the core network may be provided degraded signaling and data connections as described elsewhere herein, until connectivity to the core network is restored.

In some embodiments, a core network-wide policy may be promulgated by a server, such as an operations support system (OSS) server. The OSS server may promulgate policies for one core network or more than one core network (e.g., for a multi-operator core network, or MOCN). The OSS server may take into account information about natural disasters in the region, sports events, scheduled or unscheduled service outages, and other situations that may result in an increased likelihood of a signaling storm. Such information may also be provided by and/or shared with one or more nodes in the network, with or without an OSS server, in some embodiments. The network-wide policy may be applied to a plurality of eNodeBs, a plurality of coordination nodes which may be signaling concentrators, or both.

In some embodiments, stateful filtering techniques may be used. A stateful firewall is a firewall that, in addition to performing inspection of packets being transmitted via the firewall in isolation, keeps track of the state of network connections traveling across it. For example, a stateful firewall can identify when a network connection has been made, and will pass packets related to that connection, but will deny other packets that are not part of any known active connection. In the context of the disclosure herein, stateful filtering may be used at a network node to identify spurious signaling messages from network nodes, including mobile devices and UEs as well as core network nodes, that are not part of a known active connection and that are not valid attach messages. Such spurious signaling messages may be identified by keeping track of the attach state and bearer state of each UE being serviced by the network node. The network node may be the eNodeB itself, or it may be a coordination node being used as a signaling concentrator node, or both.

Stateful filtering may use IMEI or IMSI, or may use IP address and port, protocol type (TCP, UDP, SCTP, etc.), protocol information at various levels, including application-layer protocols (HTTP, DNS, etc.), security and encryption status, GTP tunnel status, and the like to perform filtering. Stateful filtering may also maintain and track protocol state for standard 3GPP protocols such as attach protocols and bearer establishment protocols, in order to, for example, reject and filter duplicate or spurious messages that are not expected as part of a particular protocol-specific signaling flow. Deep packet inspection may be used as needed to provide any information needed for state monitoring and tracking.

In some embodiments, proxy functionality in the filtering network node may be used to maintain state to be used for filtering, such as by maintaining an S1 proxy, an X2 proxy, or another type of proxy at the network node for an eNodeB. The state information being used at the network node may be shared with other network nodes for performing filtering of the same UE's flows at other points in the network, or for general UE characterization purposes to develop profiles of typical traffic. State may be maintained for some UEs or for all UEs, and may be maintained indefinitely, maintained for a configurable set time, maintained until network load has diminished, or maintained until manually purged, among other potential alternative embodiments.

In some embodiments, the methods and techniques described herein may be applied in situations where one or more mobile devices (e.g., UEs) have active circuit-switched voice calls, data bearers, or data calls (i.e., VOIP or VOLTE). In such situations, the state of the active calls may be maintained at one or more nodes, and this state can be used to ensure that signaling for any of these active calls is permitted to pass through unfiltered.

In some embodiments, fingerprinting and profiling of unusual or anomalous signaling may be performed. Methods for fingerprinting network traffic, such as those described in, e.g., U.S. Pat. Nos. 8,474,043 and 8,656,493, hereby incorporated by reference in their entirety, may be used to identify which signals are expected and which signals are anomalous. For example, a set of rules may be created, either a priori, based on 3GPP protocols, or based on observation of a training corpus of data, defining what should be considered ordinary or normal traffic. The rule-based system may define, for example, that an attach message should be followed by certain other messages, such as a bearer setup message, according to the 3GPP protocol. The resulting set of rules may then be used as a rule tree, to match any signaling messages that are received at a node in the network. Messages that are not part of a sequence of messages encoded in the rule tree can be flagged as anomalous. Once one or more anomalous messages have been flagged, the network node may examine other messages from the same UE and potentially filter them. Fingerprinting may be performed on live data, or on training data, or both, in some embodiments.

In some embodiments, certain types of activity may be flagged as anomalous, including: a number of attach or detach requests above a flooding threshold and within a certain time; a sequence of attach requests to more than one eNodeB within a certain time; a sequence of attach requests to the same eNodeB without completing the attach sequence within a certain time; a sequence of mobility registration requests within a certain time; unusual upload activity; unusual download activity; activity indicating a port scan of network resources; activity on a particular set of ports previously identified as belonging to a rogue UE or anomalous node; and other activities. In some embodiments, IMSI, IMEI, operating system, operating system version, browser, browser version, app name, app version, protocols at various layers, including application-layer protocols (e.g., HTTP, VOLTE), IP address, or other parameters may also be considered in determining whether a UE is anomalous or a rogue node.

In some embodiments, rogue mobile device detection may be complemented by detection of rogue eNodeBs, rogue base stations, and rogue relay nodes according to the same methods.

In some embodiments, signaling messages sent from a mobile device may be subject to being dropped (i.e., denying service), being delayed (degraded service), or being forwarded according to the specification, which during a signaling storm may constitute priority service. If a signaling message, such as an attach message, is denied or degraded, data service for that mobile device generally will be denied or degraded as well as a result. In some embodiments, various additional options may be offered for degraded service, as follows.

In some embodiments, attach messages may be degraded by permitting a mobile device to attach, but by then not permitting the mobile device to establish a data connection (e.g., bearer or tunnel) with the core network ("zombie attach"). This has the result of temporarily reducing signaling from the mobile device, as it will not re-request an attach. In some embodiments, a mobile device may be permitted to attach, and may subsequently be permitted to establish a data connection with a restricted, capped, or throttled bandwidth. The throttling may be put in place temporarily by a policy at a core network node, such as a signaling concentrator, a mobility management entity (MME), a serving gateway (SGW), or a packet gateway (PGW). Throttling may permit a large number of users to send and receive urgent text messages in an emergency situation. The throttling may be subsequently removed.

In some embodiments, data connections for a given mobile device may be terminated and the resulting capacity used to establish a data connection with another mobile device. In some embodiments, circuit-switched connections but not data connections, or vice versa, or VOLTE bearers but not regular LTE data bearers, or vice versa, may be provided for a given mobile device. In some embodiments, an attach message may be degraded by the mobile device being directed to connect to another base station on another radio access technology (inter-RAT transfer). For example, if a mobile device is attempting to connect to a heavily-loaded 4G cell, a signaling concentrator may direct the 4G cell to send the mobile device to a nearby 3G cell. In some embodiments, emergency calls only may be permitted.

FIG. 1 is a schematic diagram illustrating a signaling storm in an operator network. A large number of user equipments (UEs) 101 are each contributing to a signaling storm, causing a series of eNodeBs to be overloaded. Here, eNodeB group 102, eNodeB group 103, eNodeB group 104, and eNodeB group 105 all suffer the consequences of the signaling storm. Each eNodeB handles many UEs. Mobility management entity (MME) 106 handles mobility for all UEs attached to each of eNodeBs 102, 103, 104, 105. Normally, under non-overload, non-signaling storm conditions, MME 106 is able to handle mobility and signaling for all UEs in a timely fashion. However, when all UEs are requesting service at the same time, MME 106 is saturated and is unable to handle servicing all UEs in a timely fashion. Saturation of MME 106 may occur as a result of saturated signaling bandwidth; saturated backhaul bandwidth; overloaded processing capacity; too many threads active at the MME; or for a variety of other reasons. MME 106 is in communication with home subscriber server (HSS) 107. HSS 107 is responsible for providing authentication information for a UE that desires to attach to the network. However, when MME 106 is overloaded, it may send partial or malformed requests to HSS 107, further causing overload. HSS 107 may also be responsible for other parts of the network (not shown), and as it begins to slow down, it may negatively affect those other parts of the network also.

Figure 2:
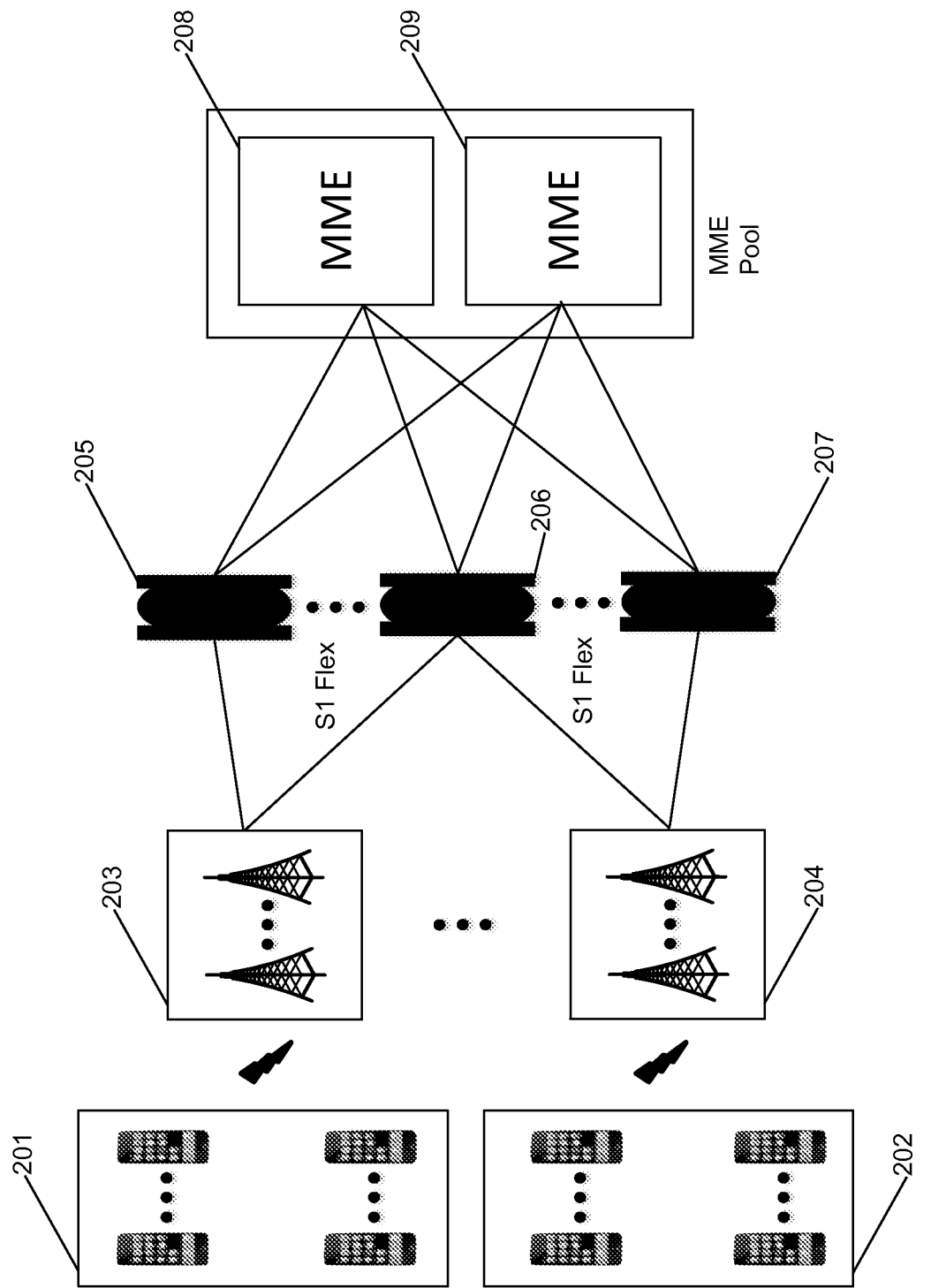
FIG. 2 is an architecture diagram illustrating a multi-RAN, multi-MME network with a series of signaling concentrator nodes, in accordance with some embodiments.

FIG. 2 is an architecture diagram illustrating a multi-RAN, multi-MME network with a series of signaling concentrator nodes, in accordance with some embodiments. UEs 201 are attached to eNodeB group 203. UEs 202 are attached to eNodeB group 204. The eNodeB group 203 is connected, via the S1-Flex protocol, to signaling concentrator nodes 205 and 206. The eNodeB group 204 is connected, via the S1-Flex protocol, to signaling concentrator nodes 206 and 207. Signaling concentrator nodes 205, 206, and 207 are connected, via the S1-Flex protocol, to a pool of MMEs that includes MME 208 and MME 209, which provides access to the core network for the concentrator nodes and also all the eNodeBs and UEs connected through the concentrator nodes. Note that the architecture is intended to scale, with dots in the diagram showing where additional eNodeB groups may be present and may be coupled to additional concentrator nodes.

The concentrator nodes 205, 206, 207 each act to receive, and to thereby concentrate, signaling messages from eNodeBs 203 and 204. Once the concentrator nodes have received these signaling messages, they can then process them before passing them onto MMEs 208, 209. By performing processing and applying policies to the messages, the concentrator nodes can prevent MMEs 208, 209 from becoming overloaded; thus, this functionality can be thought of as a firewall between the eNodeBs and the core network. By processing incoming messages at a rate substantially equal to the line data rate from the eNodeBs, the concentrator nodes can themselves avoid becoming overloaded.

The concentrator nodes 205, 206, 207, each with this firewall capability, may work together to protect the core network. As shown in the diagram, eNodeBs 203 are in communication with both concentrator 205 and concentrator 206. If one of the concentrators is becoming overloaded, it may request help from a neighbor, or may request that an eNodeB use a different concentrator, or may create a direct forwarding path to another concentrator, in some embodiments. The firewall they provide is thus a distributed firewall. Other distribution mechanisms are within the skill of a practitioner in the art.

One way that the concentrator nodes provide their firewall capability is by providing proxy capability. The concentrator nodes 205, 206, 207 each maintain a state machine for each eNodeB and for each core network they are connected to. In some cases, it may be advantageous to proxy the plurality of eNodeBs 203 to appear to the MMEs as a single eNodeB (which is made possible by using the standard S1 or S1-Flex protocol). This reduces signaling even further, and protects the MME from a signaling storm. The resultant overhead is handled by the concentrator node in its state machine. This may be thought of as a virtualization layer or as analogous to a network address translation layer. This may also be thought of as providing stateful firewall capability, as described further herein.

Figure 3:
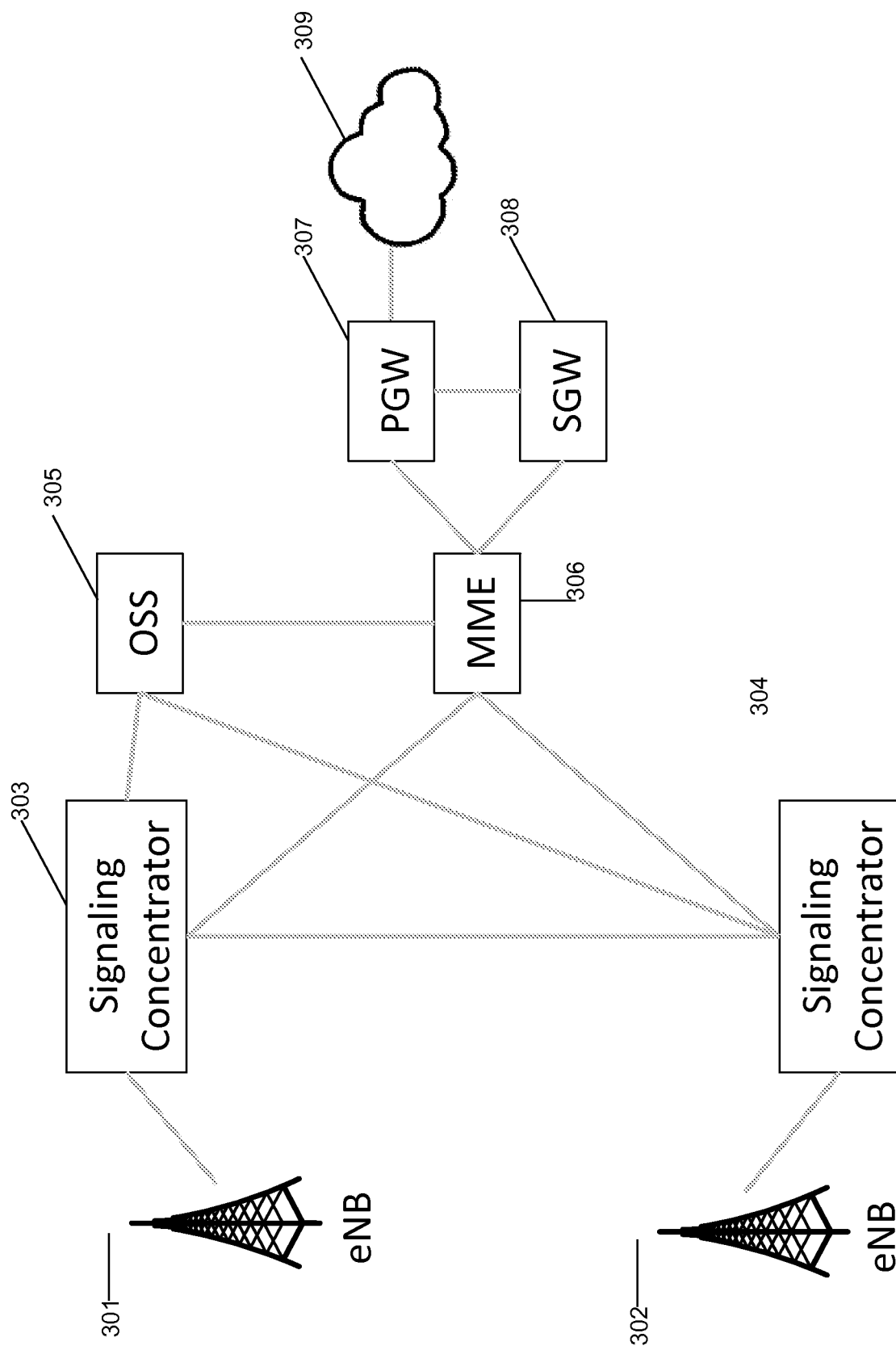
FIG. 3 is an architecture diagram illustrating a multi-RAN network with a series of signaling concentrator nodes and a core network, in accordance with some embodiments.

FIG. 3 is an architecture diagram illustrating a multi-RAN network with a series of signaling concentrator nodes and a core network, in accordance with some embodiments. eNodeB 301 is coupled to signaling concentrators 303 and 304. eNodeB 302 is also coupled to signaling concentrators 303 and 304. Signaling concentrators 303 and 304 are coupled to each other, enabling them to share profiles and signaling message processing loads. Signaling concentrators 303 and 304 are also each connected to the core network, specifically, to an operational support system (OSS) 305 and an MME 306. OSS 305 is typically used in the core network by a network operator for setting policies. Here, the OSS can be used as a source of prioritization policies for signaling concentrators 303 and 304. For example, signaling from IMEIs that are not authorized to be on the network at all will be dropped. OSS 305 may have access to historical data in the core network, and this information may be leveraged to create policies. At the signaling concentrators, relevant policies may be retrieved by searching on IMEI or IMSI, which provides a quick method for applying relatively granular policies. Alternatively, policies may be based on specific eNodeBs, or on a particular type of traffic, or on patterns of traffic at a particular time, or based on traffic that exceeds a threshold, such as a threshold for too many attaches within a certain time period. MME 306 is used by the core network to track and manage mobility of UEs. Here, signaling concentrators 303 and 304 act as distributed stateful firewalls for protecting MME 306 from signaling load and signaling storms. In the depicted diagram, MME 306 is connected to packet gateway 307 and serving gateway 308, which provide access to network services such as phone calls and the public Internet 309. In the depicted architecture, concentrators 303 and 304 perform the function of examining signaling messages and determining whether they should be forwarded, dropped, or delayed, and are thereby able to protect OSS 305 and MME 306 from signaling storms at the edge of the network, without unduly burdening the core network.

Figure 4:
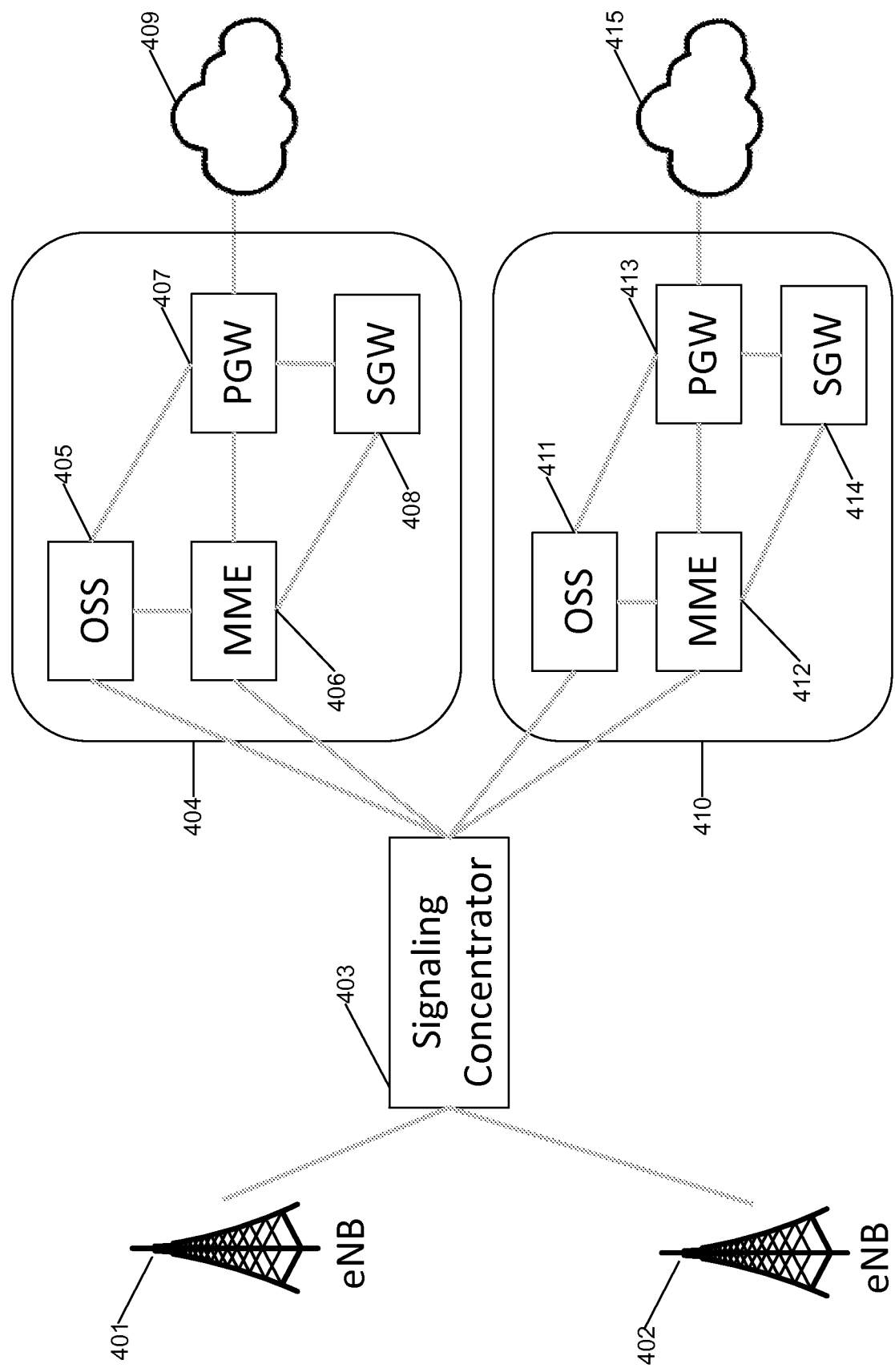
FIG. 4 is an architecture diagram illustrating a multi-RAN network with a signaling concentrator node and multiple operator core networks, in accordance with some embodiments.

FIG. 4 is an architecture diagram illustrating a multi-RAN network with a signaling concentrator node and multiple operator core networks, in accordance with some embodiments. eNodeBs 401 and 402 are coupled to signaling concentrator 403. Signaling concentrator 403 is coupled to both core network 404 and core network 410. Core network 404 includes OSS 405, MME 406, PGW 407, and SGW 408. Core network 410 includes OSS 411, MME 412, PGW 413, and SGW 414. Packet gateway 407 provides access for core network 404 to Internet provider 409. Packet gateway 413 provides access for core network 410 to Internet provider 415. Note that signaling concentrator 403 is coupled to both an OSS and an MME in each core network.

In FIG. 4, the signaling concentrator node examines signaling messages from eNodeBs 401 and 402, and determines whether they should be forwarded, dropped, or delayed. Signaling concentrator 403, however, is able to apply policies that apply to communications targeting one or the other core network. Signaling concentrator 403 may first separate the communications by target network, and may then apply policies for that network. Alternatively, signaling concentrator 403 may cache a mapping of IMSIs to their respective core networks, and then may use IMSI to identify the appropriate core network for policies. Alternatively, one or both core networks may be searched for policies that apply to a given IMSI, and one or both policies may be applied. Signaling concentrator 403 may cache or retain some or all of the policies used by one or both of the core networks.

In some embodiments, a pool of signaling concentrator nodes may be used instead of a single server. Using a pool, the performance of the signaling concentrator can be provisioned to exceed the combined line rate of the connections between eNodeBs 401 and concentrator 403, and between eNodeB 402 and concentrator 403.

Figure 5:
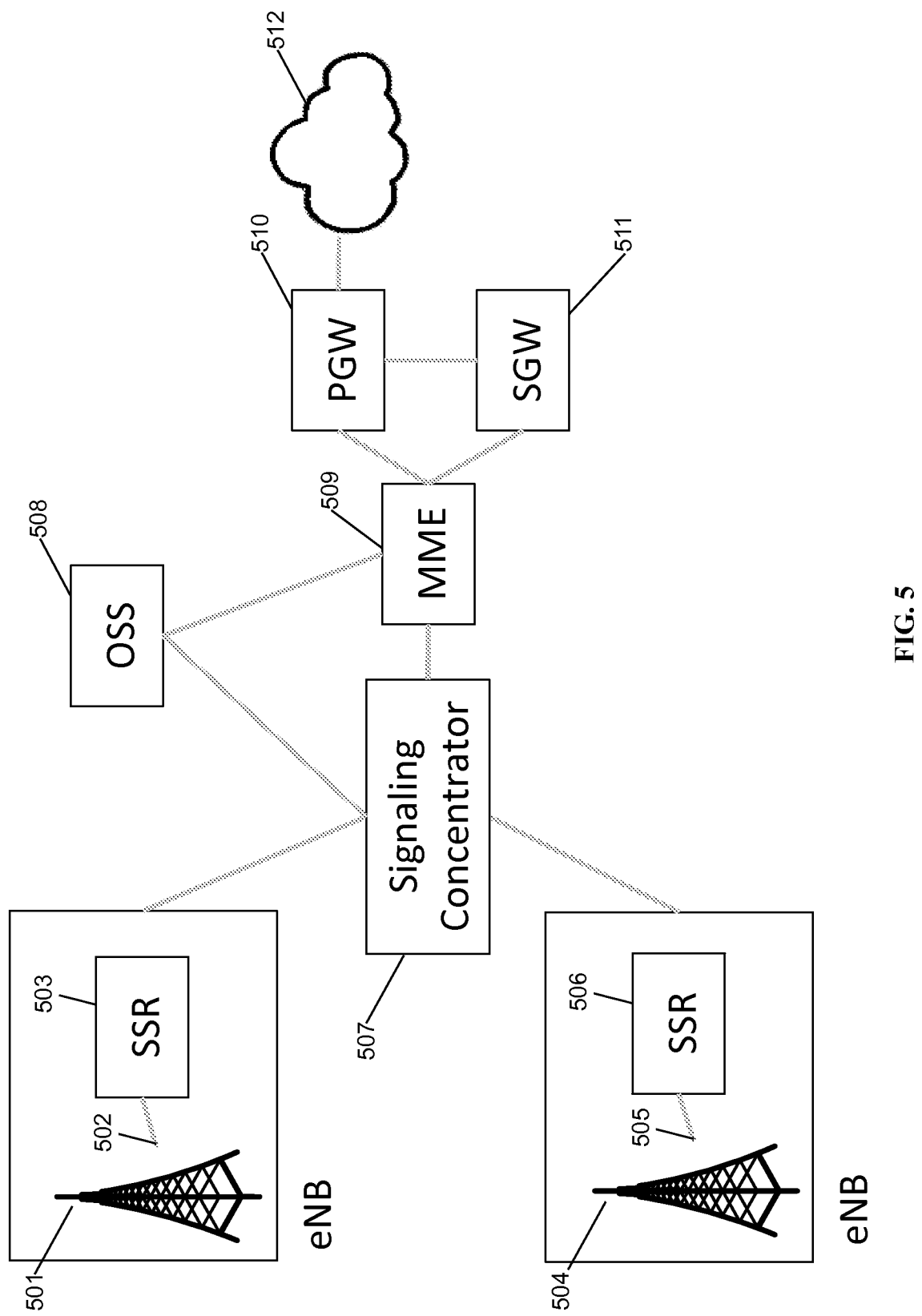
FIG. 5 is an architecture diagram illustrating a network in which the signaling storm reduction functionality is located at both the RAN and at a signaling concentrator node, in accordance with some embodiments.

FIG. 5 is an architecture diagram illustrating a network in which the signaling storm reduction functionality is located at both the RAN and at a signaling concentrator node, in accordance with some embodiments. Enhanced eNodeBs 501 and 504 each include a regular eNodeB 502, 505 and a signaling storm reduction (SSR) module 503, 506. The remainder of the architecture is as described above with respect to a single core network. Signaling concentrator 507 is coupled to both enhanced eNodeBs 501 and 504. Signaling concentrator 507 is also coupled to OSS 508 and MME 509. MME 509 is coupled to PGW 510 and SGW 511. PGW 510 is the gateway to the public internet 512.

In some embodiments, some or all of the functions of signaling concentrator 507 may be provided by SSR modules 503 and 506. Policies may be cached at the SSR modules. The SSR modules may also determine whether to delay, drop, or forward signaling messages from UEs attached to their individual eNodeBs. In some embodiments, the functions of signaling concentrator 507 may also be provided at signaling concentrator 507, such that multiple levels of signaling storm suppression are in place. Caching and distribution of authentication information, prioritization policies, and other information may be performed on a scheduled basis, in some embodiments, and may be restricted to information about UEs that are associated with a particular eNodeB based on historical records, in some embodiments.

Figure 6:
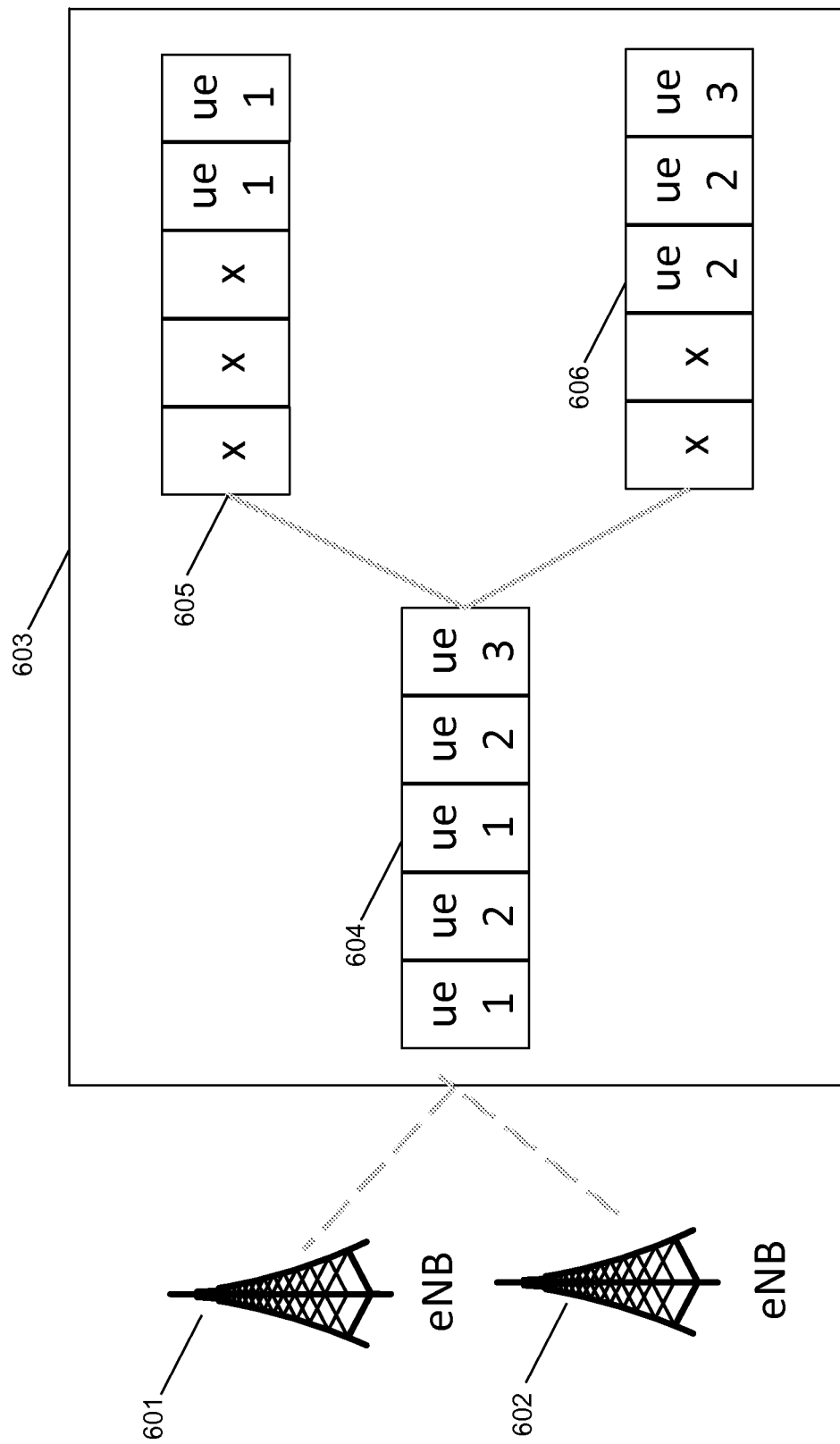
FIG. 6 is a schematic diagram illustrating a prioritization scheme, in accordance with some embodiments.

FIG. 6 is a schematic diagram illustrating a prioritization scheme, in accordance with some embodiments. eNodeBs 601 and 602 send signaling messages to signaling concentrator 603; the signaling messages are requests from, in this figure, three UEs: UE1, UE2, and UE3. Signaling concentrator 603 includes an input queue 604, a first priority queue 605, and a second priority queue 606. Input queue 604 includes all messages received at the signaling concentrator and may be ordered in FIFO order. The input queue is not sorted by UE or by priority. A process that takes messages off of input queue 604 may identify the IMSI being used in each of the messages, and may search for policies that apply to that UE or message. Based on policies, some messages may be sent to higher-priority queue 605 and others may be sent to lower-priority queue 606. Various types of policies may be applied, as described elsewhere herein.

In some embodiments, higher-priority queue 605 may be processed by simply forwarding each message in the queue to the core network. In other words, the signaling concentrator is not interfering with the messages in the queue. In some embodiments, if proxying is necessary it may be performed for the messages in the higher-priority queue. Here, messages from UE1 are directed to higher-priority queue 605. Turning to the lower-priority queue, the signaling concentrator may individually process each message again to determine if the messages are subject to policies, in some embodiments. Some messages may be delayed, or may remain in the queue, or may be dropped. If the higher-priority queue overflows, messages may be redirected to the lower-priority queue; if the lower-priority queue overflows, messages may be dropped, in some embodiments. In some embodiments, if any queue overflows, the system may take additional steps to drop messages, under the logic that overflowing queues mean that a signaling storm is underway.

Figure 7:
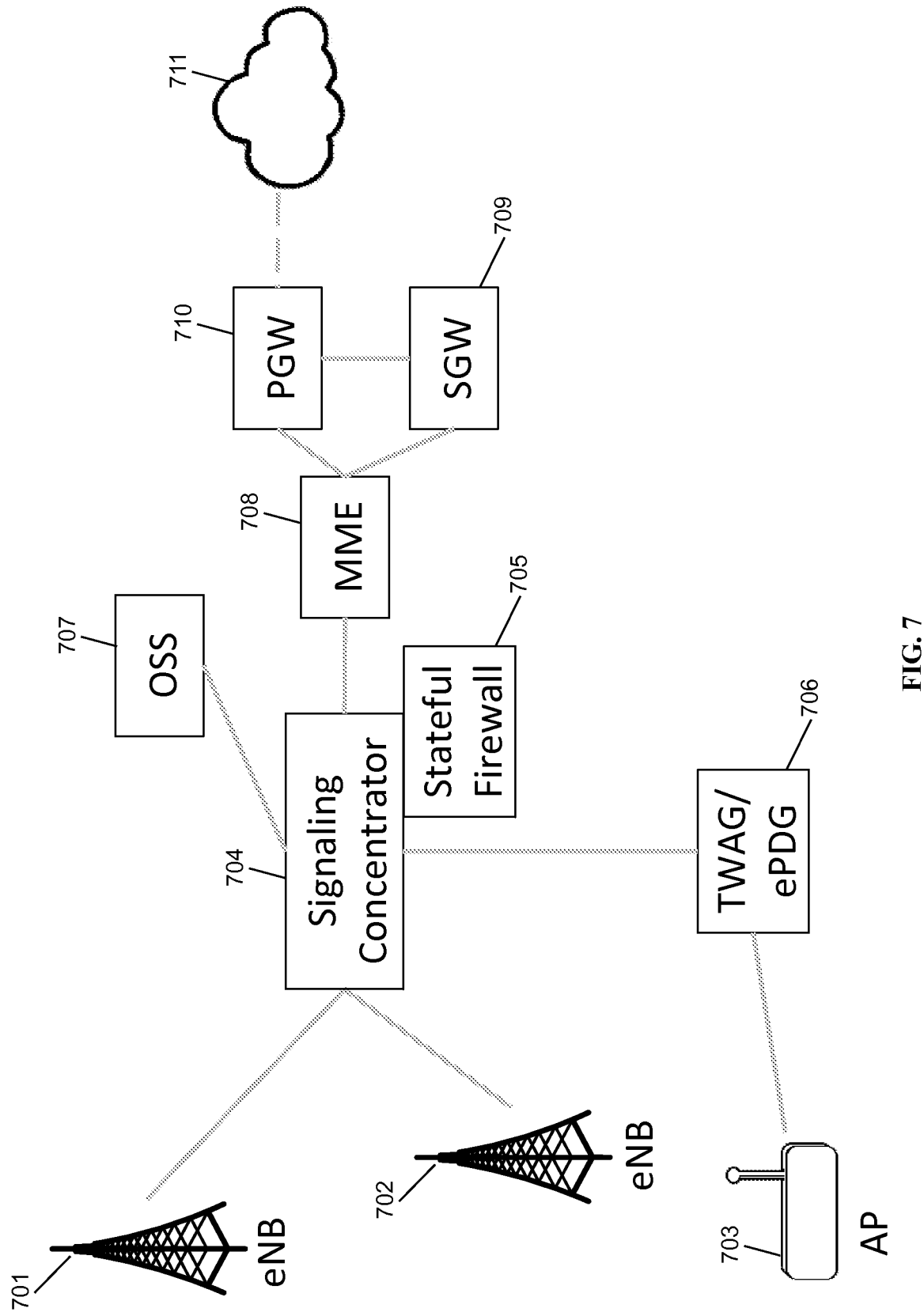
FIG. 7 is an architecture diagram showing a signaling concentrator and stateful firewall providing signaling storm reduction in a multi-RAT environment, in accordance with some embodiments.

FIG. 7 is an architecture diagram showing a signaling concentrator and stateful firewall providing signaling storm reduction in a multi-RAT environment, in accordance with some embodiments. eNodeB 701, NodeB 702, and Wi-Fi access point 703 provide access to various users using various radio access technologies. Each of the access RANs 701, 702, 703 is coupled to signaling concentrator 704 (the Wi-Fi access point 703 via TWAG/ePDG 706). Signaling concentrator 704 may provide filtering of signaling messages for all the different radio access technologies. For the examples shown, the signaling messages will be 3GPP protocol messages, and can be handled using the same architecture.

Stateful firewall 705 is part of signaling concentrator 704, and protects all the core network nodes, e.g., OSS 707, MME 708, SGW 709, PGW 710, Internet 711 from signaling storms. Stateful firewall 705 may be enhanced to include policies and rules for handling 2G, 3G, Wi-Fi, and other types of RATs, so that it can provide effective protection in a multi-RAT environment. Stateful firewall 705 may also take into account that certain access RANs may be multi-RAT, and certain UEs may be multi-RAT, such that UEs may be requested to move to other RATs if needed, and such that policies like throttling may be enforced against a given UE even on different RATs. Stateful firewall 705 may provide deep packet inspection and data tunnel inspection capability, such that it is capable of applying policies to data flows across RATs.

Figure 8:
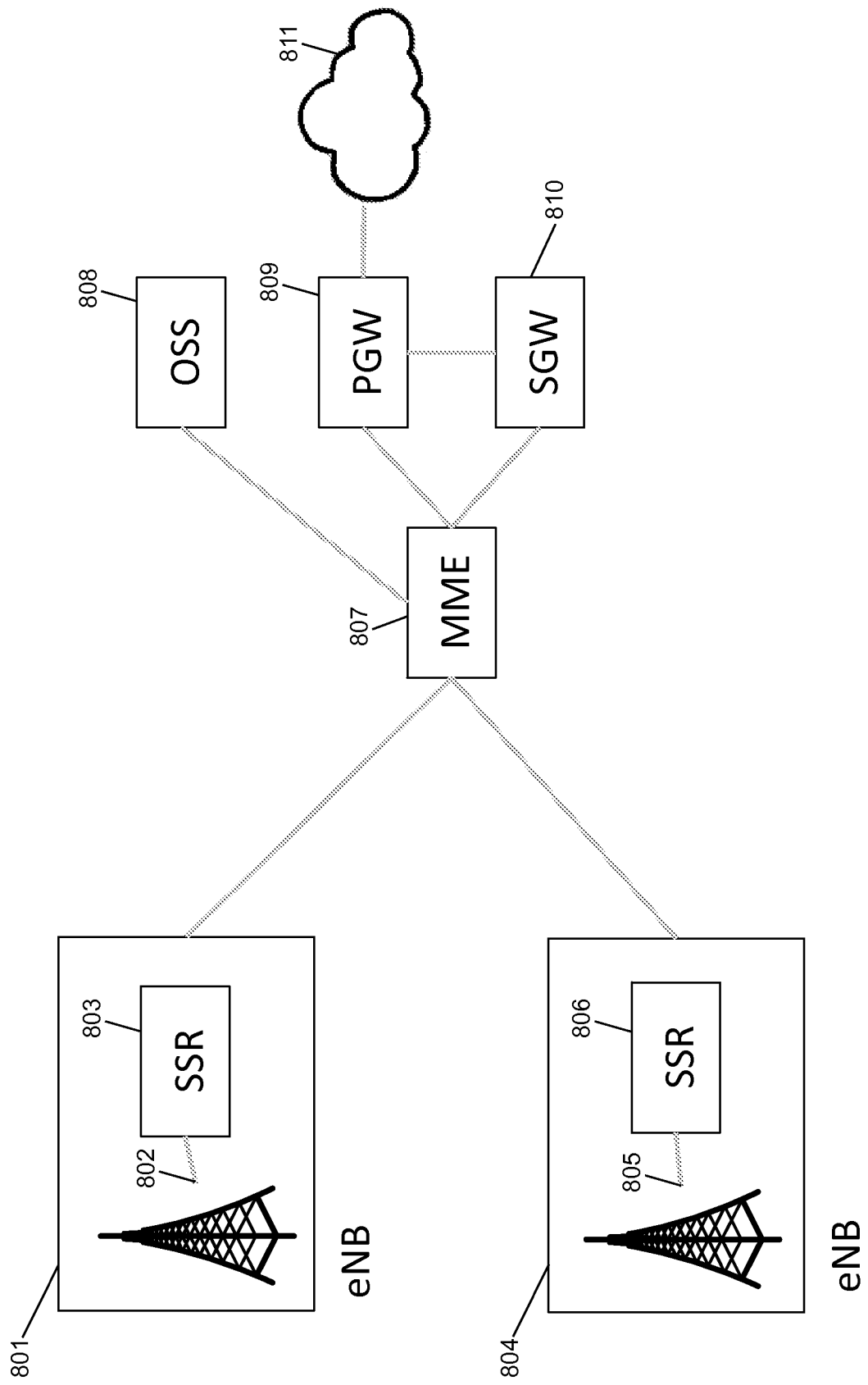
FIG. 8 is an architecture diagram illustrating a network in which the signaling storm reduction functionality is located at the RAN, in accordance with some embodiments.

FIG. 8 is an architecture diagram illustrating a network in which the signaling storm reduction functionality is located at the RAN, in accordance with some embodiments. Enhanced eNodeB 801 includes eNodeB 802 and signaling storm reduction module 803. Enhanced eNodeB 804 includes eNodeB 805 and signaling storm reduction module 806. SSRs 803 and 806 function as described above in the section relating to FIG. 5. Unlike in FIG. 5, there is no signaling concentrator module, and enhanced eNodeBs 801 and 804 communicate directly with the core network in the form of MME 807, which interfaces with OSS 808, PGW 809, SGW 810, and through PGW 809, the Internet 811. Even without a signaling concentrator node, a RAN-based signaling storm reduction module may provide advantageous reduction of signaling, in some embodiments.

A further embodiment is described hereinbelow.

In the event of a power failure in a given geographical region, all the devices in this area will try to attach to the network once the network is turned on, placing a heavy load on the core network and other infrastructure. As a result, many subscriber attaches may fail. The potential also exists for other infrastructure to be impacted and for failures to cascade to other geographic regions. This problem may also be compounded if infrastructure is gradually brought online, as the demands on the infrastructure will exceed the capacity of the subset being brought online. While many overload and congestion related features are proposed in 3GPP Release 10, most of the features require the MME to handle the initial call and then reject it based on variety of parameters (say APN or access-priority) etc., and do not specify a solution for congestion at a critical node such as the MME or other similar nodes.

In some embodiments, a signaling concentrator as described above may be used, situated in the network between the base stations (eNodeBs) and the core network. The signaling concentrator may perform a virtualization function to present itself as a single eNodeB to the core network. The signaling concentrator is also situated in the signaling path as a gateway, and thus enables various types of congestion control. The signaling concentrator may also include a local core module, or local evolved packet core (local EPC), for providing various additional benefits and functions. The signaling concentrator is described above as a gateway node.

In some embodiments, the gateway node, being in the path of the call, will be able to detect congestion or overload before the core network itself. The gateway node can be configured for a given MME, a set of MMEs (in case of a MME pool), or another core network node or nodes, and can perform throttling to ensure a particular maximum call rate for each MME. As the gateway node can detect the arrival rate and the call success rate, it can intelligently throttle the rate of calls being sent to the MME using various algorithms. This throttling may be performed based on configuration data or may be based on real-time observation within a time window, e.g., without configuration. In some embodiments, configuration may be avoided by using a line rate of a connection between the gateway node and the MME as a threshold for the maximum number of messages that can be received without the MME going into an overload state. The gateway node may handle 3GPP-standard S1AP overload control messages if it receives these from the MME, and may honor these messages as per the specification during the MME overload period.

In some embodiments, to prevent the MME from having to determine whether to reject an incoming request, the gateway node may take over some of the functions currently performed at the MME. The gateway node may behave like an MME and send Attach Reject with a backoff timer to the UE if supported by the UE. If the UE does not support attach backoff, the gateway node can release the radio connection towards the UE with appropriate cause to make it backoff the attach procedure. In some embodiments, the gateway node can reject the UE by sending it to an appropriate 3G base station.

In some embodiments, the gateway node can reject low-priority access calls, or can be configured to reject calls based on IMSI/IMEI. In some embodiments, the gateway node can reject based on IMSI/IMEI ranges. For example, if such ranges are allocated to machine to machine (M2M) or Internet of Things (IoT) devices, these can be given lower priority as a class or a range. In some embodiments, the gateway node can reject calls of roamers (i.e., mobile devices attached to and roaming from other cells) during periods of overload. In some embodiments, the gateway node can allow high priority calls or emergency calls and find the best-suited or least-overloaded MME to handle such calls.

In some embodiments, the gateway node can be configured to use its local EPC functions for a given range of subscribers, for example, by IMSI/IMEI or IMSI/IMEI range, and provide access to such subscribers in case the EPC is overloaded. This access may be provided over the public Internet without going through an operator core network, using an alternative failover backhaul connection, in some embodiments.

In some embodiments, there may be categories of subscribers, such as public safety providers which should get network access at all times, and such subscribers ("VIP users") may be given access via an open network or a secure network, as available. In some embodiments, the gateway node can provide basic MME functionality which can bypass the authentication for such VIP users and provide them with a local IP address from the local gateway. The local gateway may provide access to the Internet, to a core network, or both, and may provide access to one or more core networks and one or more access point networks (APNs). The local gateway may provide, e.g., local IP access (LIPA), selected IP traffic offload (SIPTO), or other IP routing functionality based on certain target networks, certain source IMEIs/IMSIs, or other criteria. VIP users can then get a minimum pipe to the Internet through the gateway node directly instead of going to the overloaded EPC. In some embodiments, VIP users can use this connection via the gateway node to reach their own application gateway/server, which may let them communicate among themselves, including via a peer-to-peer or point-to-point IP connection between devices.

In some embodiments, when the load on the core network returns to normal or if the gateway node determines that it has to exercise more advanced MME functions, such as handover, which it cannot handle, it will terminate the user attach with an appropriate cause. This may make the user equipment re-attempt to attach, and the gateway node may permit the user to connect to the real EPC as it usually does.

There may be a momentary disruption of service because of user getting detached and re-attached, however, it will be brief.

In some embodiments, a system may include a throttling mode, in which packets or messages sent from a mobile device are dropped, delayed, shaped, rejected, or otherwise subject to traffic control during periods of congestion in the core network. The throttling mode may apply to either user data or signaling data. The throttling mode may apply only to certain types of traffic, for example, requests to connect to the network (e.g., LTE or UMTS attach requests).

One aspect of certain embodiments is the detection of congestion within the network. In some embodiments, traffic from the mobile device may be routed to the core network through an intervening gateway node. Such a gateway node is well-placed to determine whether a gateway node is under load. For example, if a mobile device connected to the gateway is generating a high number of attach requests, the gateway node may be able to determine, based solely on the rate of attach requests that are flowing through the gateway node, that the core network is likely to be subject to overloading, either now or in the near future.

Although the view of a single gateway node may be restricted to the mobile devices using that gateway node, multiple gateway nodes may share information, in some embodiments, to enable the system to identify overload conditions based on mobile device traffic from other parts of the network that may be affecting the core network, and one or more gateway nodes may thereby detect congestion.

Another aspect of certain embodiments is the determination of when to enter a throttling mode and when to exit the throttling mode. This determination may be made at the aforementioned gateway node. By deciding when the core network is overloaded at a gateway node, it is possible to avoid making the determination at the core network itself. For example, if an MME is responsible for determining itself when to start providing reduced performance, it is possible that an MME may become overloaded suddenly and may thus become unable to implement congestion management procedures. This problem is significantly mitigated by implementing congestion control at a location in the network further downstream from the core network.

In some embodiments, determination of a rate of attach requests or other messages may be based on the number of messages that flow through the gateway during a given interval. The interval may be on the order of one second. The interval may be used for measuring all requests from any source to a single target core network node, such as an MME. The interval may be monitored by a continuously running process that provides a real-time estimate of the received message rate, available whenever a determination of load state may be desired. The number of successes returned by a core network node (e.g., an MME) within the interval may also be used to determine this load state. Different intervals may be used for different load monitoring processes.

Load state may be one of the following: normal, overloaded, and down (i.e., inoperative). Load state may also be denoted using a quantitative parameter. In certain load states, the gateway may throttle inbound traffic to zero. In certain load states, the gateway may throttle inbound traffic to a small, non-zero amount. Throttling may be performed by dropping requests, by returning a rejection message using the identifier of the target core network node to appear to be the core network node with respect to the user's mobile device, or by delaying or queueing requests, or by another method.

Figure 9:
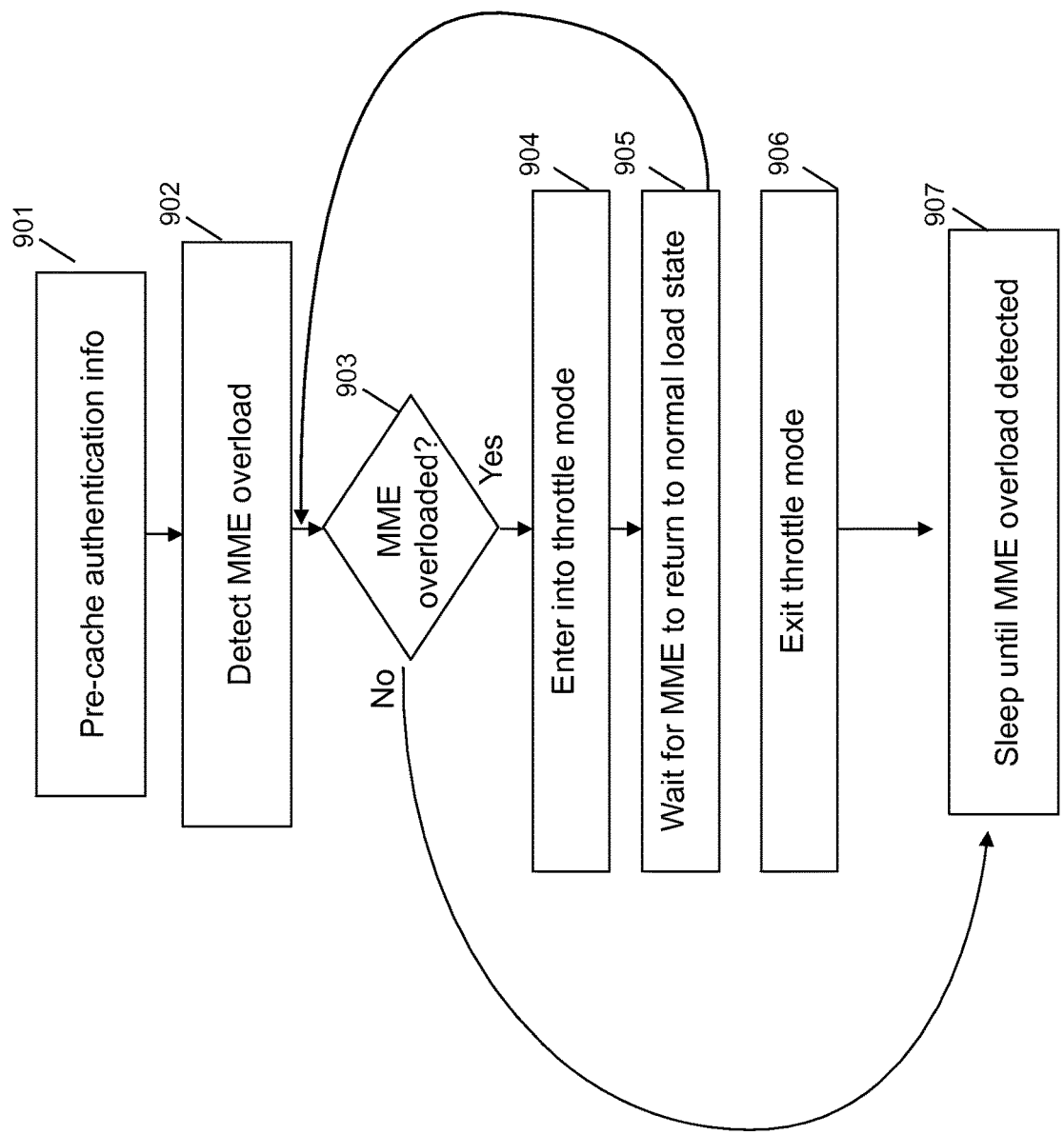
FIG. 9 is a flowchart of a method for throttling a network at a gateway, in accordance with some embodiments.

FIG. 9 is a flowchart of a method for throttling a network at a gateway, in accordance with some embodiments.

Prior to step 901, a gateway may be positioned between a mobile device and a core network, which may include a mobility management entity (MME), or another network node used for coordinating mobile devices, such as a serving gateway (SGW), packet gateway (PGW), radio network controller (RNC), serving GPRS support node (SGSN), gateway GPRS support node (GGSN), or other core network node. Where MME is mentioned herein, in some embodiments the methods described may be used with one of these other network nodes. The gateway may provide forwarding of signaling and user data between the mobile device and the core network. The gateway may be a signaling concentrator, as described elsewhere herein. The gateway may provide overload monitoring and compensation for one or more network elements within the core network.

At step 901, the gateway may pre-cache authentication information.

At step 902, the gateway may perform steps to detect MME overload or overload of another network element within the core network.

At step 903, the gateway may determine whether the MME (or other core network element) is overloaded. Overload may include various types of overloading, as described herein, including but not limited to processor load overloading, network bandwidth overloading, backhaul network overloading, radio frequency or radio bearer or radio block overloading.

If the network element is overloaded, at step 904, the gateway may enter into a throttling mode, in which network traffic going from a mobile device to the MME (or other core network element) via the gateway is restricted.

At step 905, the gateway may continue to monitor the load at the MME (or other core network element) to determine when the MME has returned to a normal load state (i.e., is not overloaded). At step 906, throttle mode is exited, and traffic is forwarded or handled normally to and from the mobile device and the core network element.

If the network element is not overloaded, at step 907, the gateway may provide normal service until such time that the network element is overloaded. This may include having the gateway sleep or otherwise suspend operation until MME overload is detected.

Figure 10:
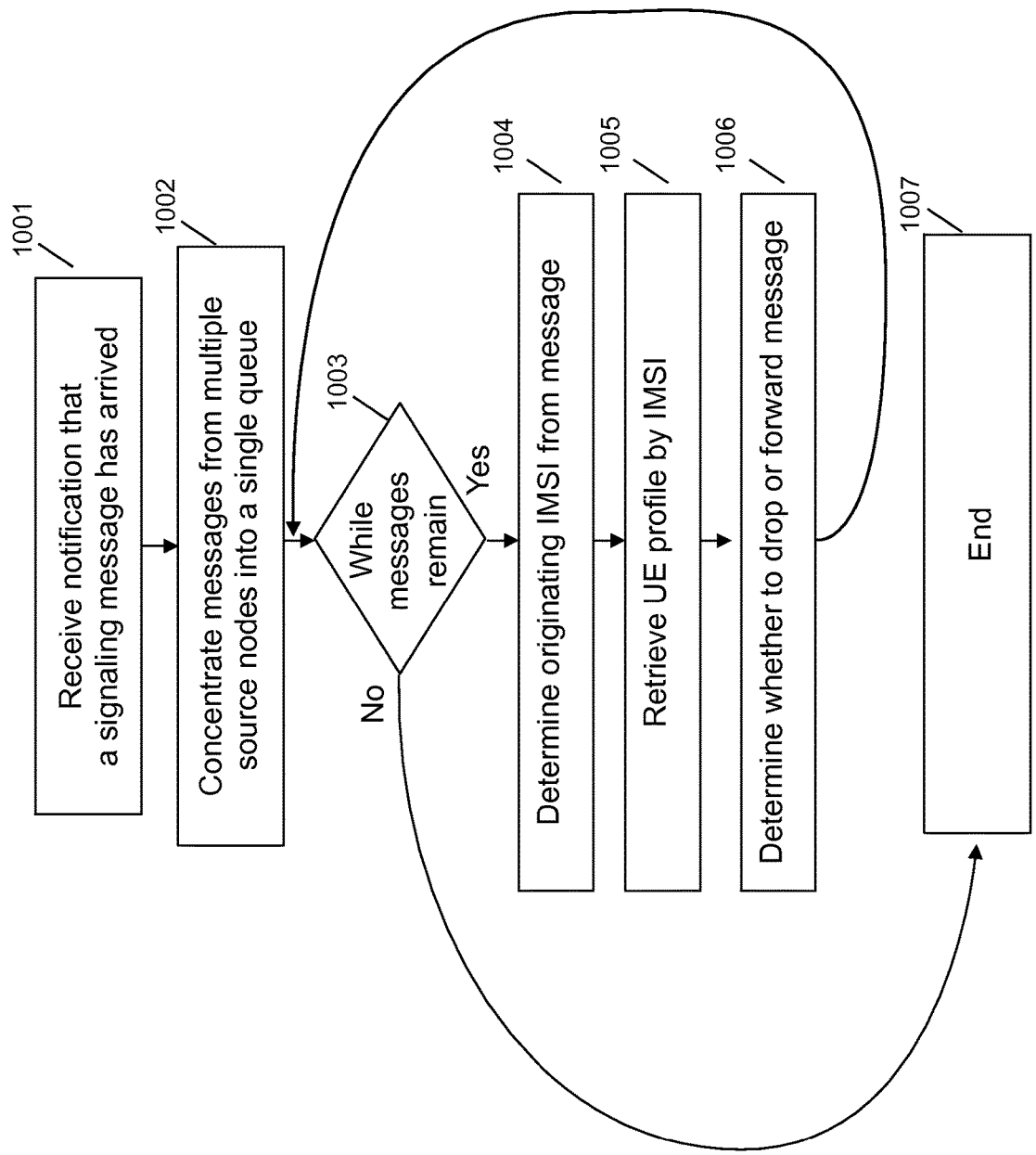
FIG. 10 is a flowchart of a second method for throttling a network at a gateway, in accordance with some embodiments.

FIG. 10 is a flowchart of a second method for throttling a network at a gateway, in accordance with some embodiments. At step 1001, attach requests are received at a gateway. The gateway may be situated between a mobile device and a node in the core network, and the attach requests may be directed from the mobile device to the core network. At step 1002, the gateway may check to see whether the core network node has indicated that it is overloaded, for example, by sending an S1AP override message to the gateway. If the core network node has already indicated that it is overloaded, the gateway may determine that it should enter into a throttle mode by going to step 1005.

At step 1003, if no overload message has been received, the gateway may count the incoming attach requests and may compute the attach message arrival rate, based on requests that it receives. Various types of rates and metrics may be monitored by the gateway. For example, the gateway may monitor attach success rates, packet drop rates, overall signaling traffic rates, overall packet data rates, number of bearers connected, number of UEs or MSC or mobile devices connected, number of active UEs/MSCs/mobile stations connected, or other metrics. Success rates may be monitored by inspecting packet envelopes of packets received from the core network node. Deep packet inspection may also be used in some embodiments to evaluate higher-layer performance data.

Each metric may have an associated threshold, above which the core network node may be assumed to be in an overload state. At step 1004, if the arrival rate is above a certain threshold, or if the success rate is above a certain threshold, the gateway may enter a throttle mode. The thresholds may be configurable, including remotely configurable.

More than one metric may be considered at the same time to make a single determination whether throttle mode should be activated, in some embodiments. Throttle mode may be tracked on a per-core network node basis, so that the gateway handles different core network nodes independently, in some embodiments. Throttle mode may be applied differently for different core network nodes, or may be applied differently for nodes in different core networks in a multi-operator core network (MOCN) situation, with thresholds being configurable independently, in some embodiments.

At step 1005, the gateway is in throttle mode. While throttle mode is active, various ways of reducing the load on the core network node may be employed. For example, as shown here, attach requests may be held, and the gateway may stop forwarding attach requests to the core network node. Alternatively, or in conjunction, the gateway may delay or drop all or some requests/packets. Alternatively, or in conjunction, the gateway may throttle requests/packets to a predetermined rate. In some embodiments, all requests and packets to a given node may be throttled. In other embodiments, a subset of all requests and packets may be throttled. For example, if the gateway determines that incoming signaling exceeds the capacity of a core network node, but incoming user data does not, only the signaling and not the user data may be throttled.

At step 1006, the gateway may, for example, count attach requests, compute attach request arrival rate and attach request success rate to determine when to exit the throttle mode. In some embodiments, evaluation of when to exit the throttle mode may include all of the parameters being evaluated for when to enter the throttle mode. In some embodiments, different core network nodes may be enabled to exit throttle mode at different times based on individual per-node metrics. In some embodiments, S1AP messages from the core network node requesting exit from throttle mode or otherwise indicating a non-overload state at the core network node may be considered for deciding when the node should exit throttle mode.

At step 1008, once this decision is made, the gateway may designate the core network node as exiting throttle mode. Attach requests and/or other requests and data may be forwarded without interruption or delay to the core network node. In some embodiments, monitoring may continue. In some embodiments, new requests may be processed starting at step 1001.

Figure 11:
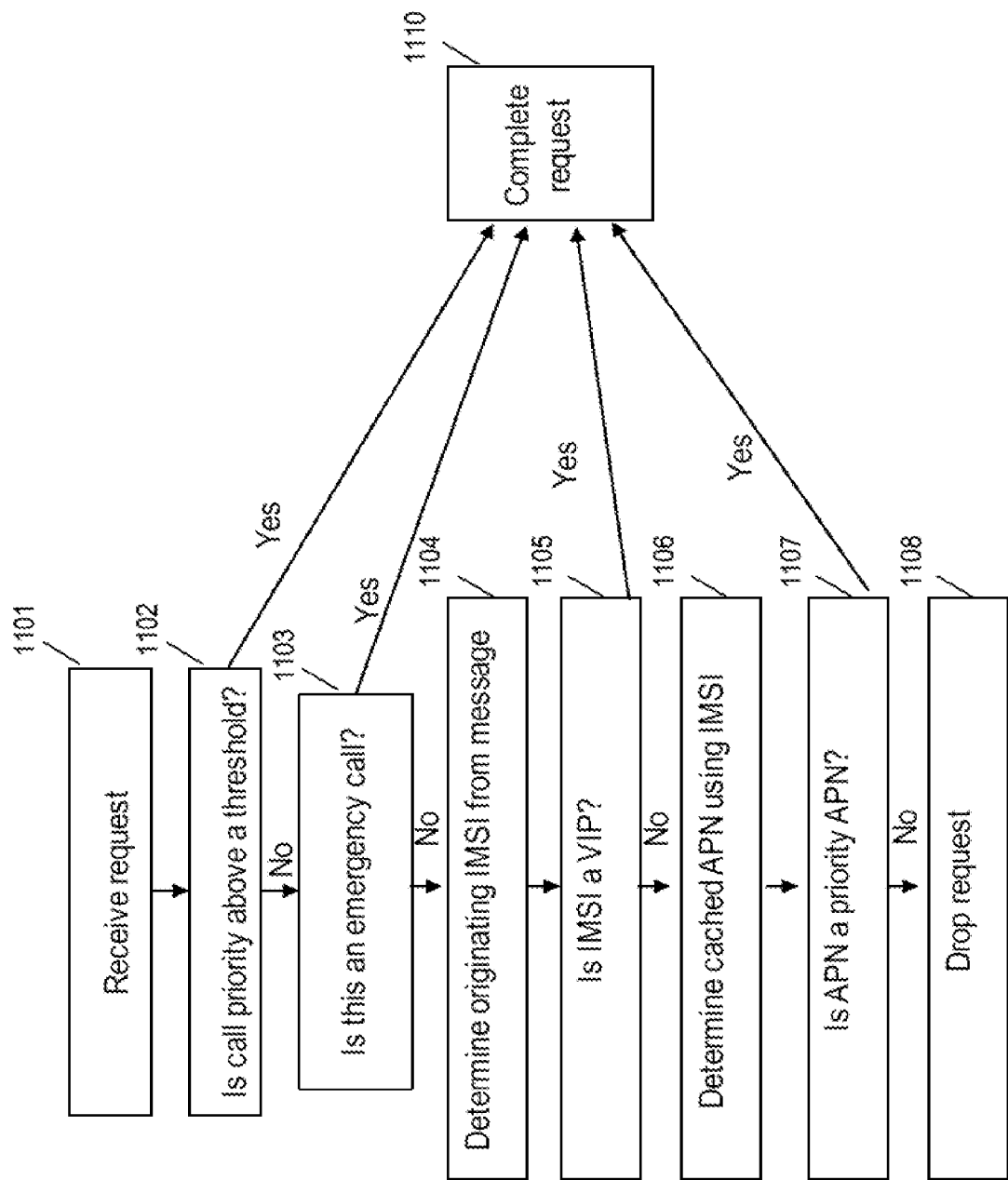
FIG. 11 is a flowchart of a method for performing throttling of requests, in accordance with some embodiments.

FIG. 11 is a flowchart of a method for performing throttling of requests, in accordance with some embodiments. Each request received during throttle mode may be handled using this method, in some embodiments. At step 1101, the gateway may receive a request. This may also be a packet or other signaling or user data directed to the throttled core network node. While attach requests are described below, other signaling and/or user data may also be processed in the same manner.

At step 1102, the gateway may check to see if the incoming attach request is for a voice call or data session with a priority above a certain threshold. If the priority is high, the gateway may complete the request at step 1110 by causing the attach request to be forwarded to the core network node. The priority threshold may be varied based on load conditions, time of day, per UE, or based on any other factor. Otherwise, processing continues at step 1103.

At step 1103, the gateway may check to see if the incoming attach request is for an emergency call, and if so, the call may be completed at step 1110. Otherwise, processing continues at step 1104.

At step 1104, the gateway may determine the originating mobile device identifier, such as an international mobile subscriber identifier (IMSI) or international mobile equipment identifier (IMEI), from the request. At step 1105, the originating mobile device identifier, IMSI or IMEI may be compared to a list of priority identifiers (a "VIP" list). For example, firefighters may have mobile devices that are on this list, ensuring that they receive priority treatment in emergency situations. The list may be preconfigured, or it may be retrieved on demand, or it may be cached. If the originating identifier appears on the list, the call or request may be completed at step 1110. Otherwise, processing continues at step 1106.

At step 1106, the originating access point name (APN) may be determined for the received request. In some embodiments, a particular mobile device may be tied to a particular core network, and to a particular APN within that core network, for completing calls and/or accessing data. This APN information may be stored within the core network in association with the IMSI and retrieved as needed. In some embodiments, the gateway may maintain a cache of IMSI and APN mappings. The cached data may be retrieved prior to the core network node being overloaded, or may be collected over time, or both. Processing continues at step 1107.

At step 1107, if an APN is determined at step 1106, the determined APN may be compared to a list of APNs to determine if it is on a list of priority origination APNs. This may be used to, for example, permit access to the Internet but not to an internal core network voice call gateway, or vice versa, or to permit access to an internal enterprise network. If the originating APN appears on the list, the call or request may be completed at step 1110. Otherwise, processing continues at step 1108.

At step 1108, the request may be dropped. In some embodiments, the request may be delayed, for example, in a queue. In some embodiments, the request may be rejected and the originating mobile device may be sent a rejection message. In other embodiments, the request may be dropped silently.

Figure 12:
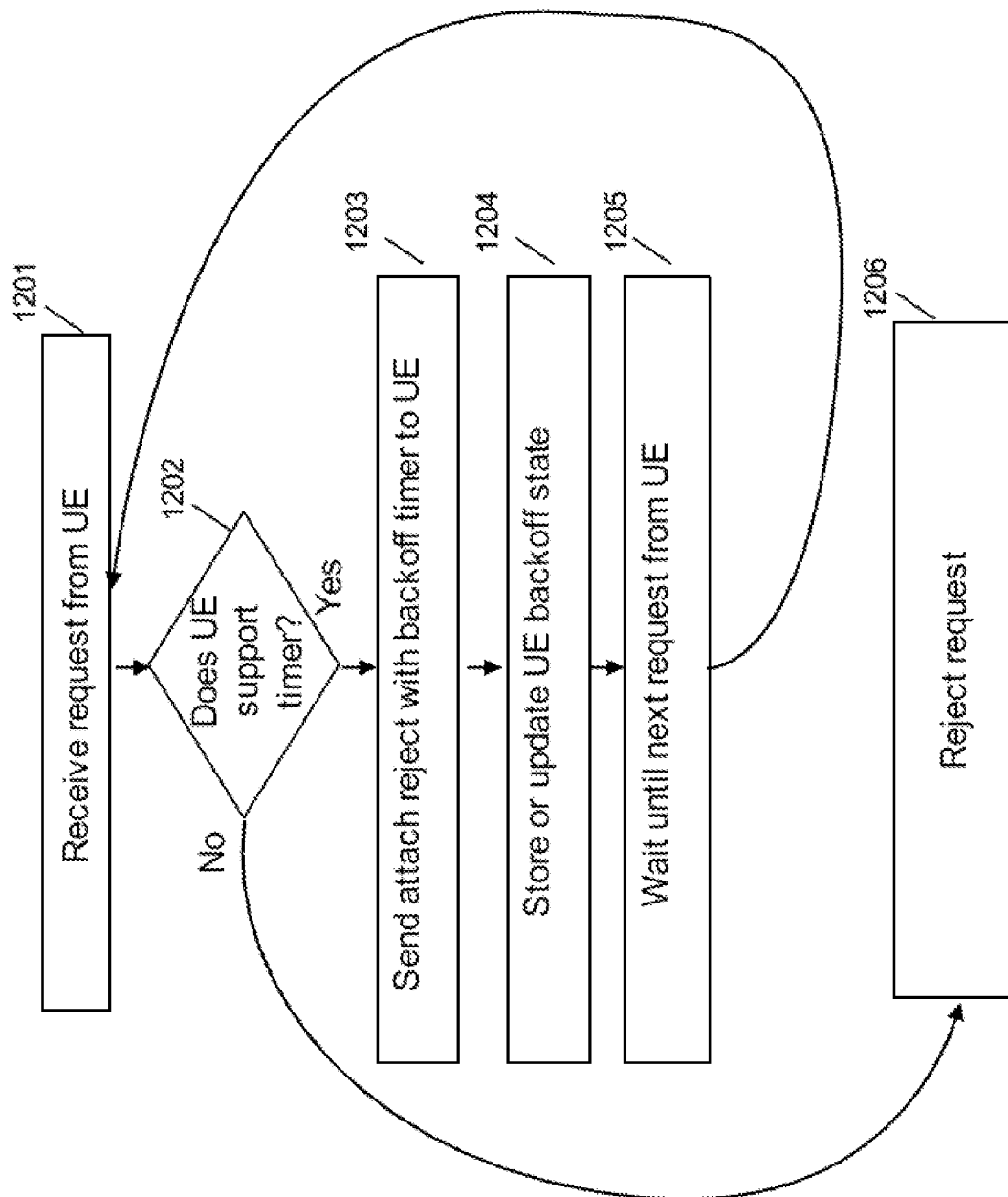
FIG. 12 is a flowchart of a method for rejecting a request, in accordance with some embodiments.

FIG. 12 is a flowchart of a method for rejecting a request, in accordance with some embodiments. At step 1201, a request is received from a user equipment (or other mobile device) by an intervening gateway situated between the user equipment and a core network node, the request being directed to the core network node. At step 1202, the gateway may evaluate whether a user equipment supports a backoff timer that is able to be triggered by a message from the gateway. If the user equipment is known to support a message-driven backoff timer, the gateway can inform the user equipment via such a message to engage the timer. The UE may then reduce load on the throttling gateway by automatically resending the request, which allows the gateway to drop the existing, currently-pending request and thereby reduce resource usage.

In some embodiments, a UE may support a self-directed exponential backoff delay. Such a UE may automatically retry the request based on a time that increases with each rejection received. In some embodiments, the gateway may cause this UE method to be engaged. In other embodiments, the UE may rely on a network node to suggest a delay time, or may modify its own backoff delay based on a suggested delay time, and the gateway may send a suggested backoff time to such a UE.

The evaluation of the UE may be based on, for example, a supported 3GPP specification release version, as reported by the UE in a message, or may be based on a request of same of the UE, or by both (e.g., handshaking), or by looking up a received equipment name to a preconfigured lookup table, or by IMSI or IMEI, or by another method.

At step 1203, the attach request may be rejected by the gateway, and an attach reject message may be sent to the UE. The attach reject message may include a backoff timer message. The backoff timer message may have a configured time. The configured time may reflect a best guess of when congestion at the core network node will abate. The configured time best guess may be based on historical patterns, or may be based on messages received from the core network gateway, or may be a value set by an operator (configured in real time or pre-configured). The configured time best guess may also be based on a prior backoff time, as described below. Alternately, no configured time may be provided, and the UE may be directed thereby to perform backoff as it deems appropriate.

At step 1204, UE information may be stored or updated. Specifically, the gateway may track: whether the UE is in backoff; the IMSI of the UE; the backoff time; the request type; the request destination; or other parameters as deemed appropriate. If the UE is already being tracked, values that have changed since the last request will be updated.

At step 1205, processing ends until an additional request is received from the same or another UE, at which time processing continues at step 1201.

When a request is received from a UE that has previously been sent a backoff timer rejection, the following changes in the method may apply. First, a backoff timer time value may be increased, to cause exponential backoff of resending the request by the UE. In some embodiments, the prior-sent time value may be multiplied by a number, such as two, i.e., doubling, to generate the new time value. Second, the backoff state of the UE may be updated, with the requested backoff time and/or the fact that the UE is in a backoff state.

Figure 13:
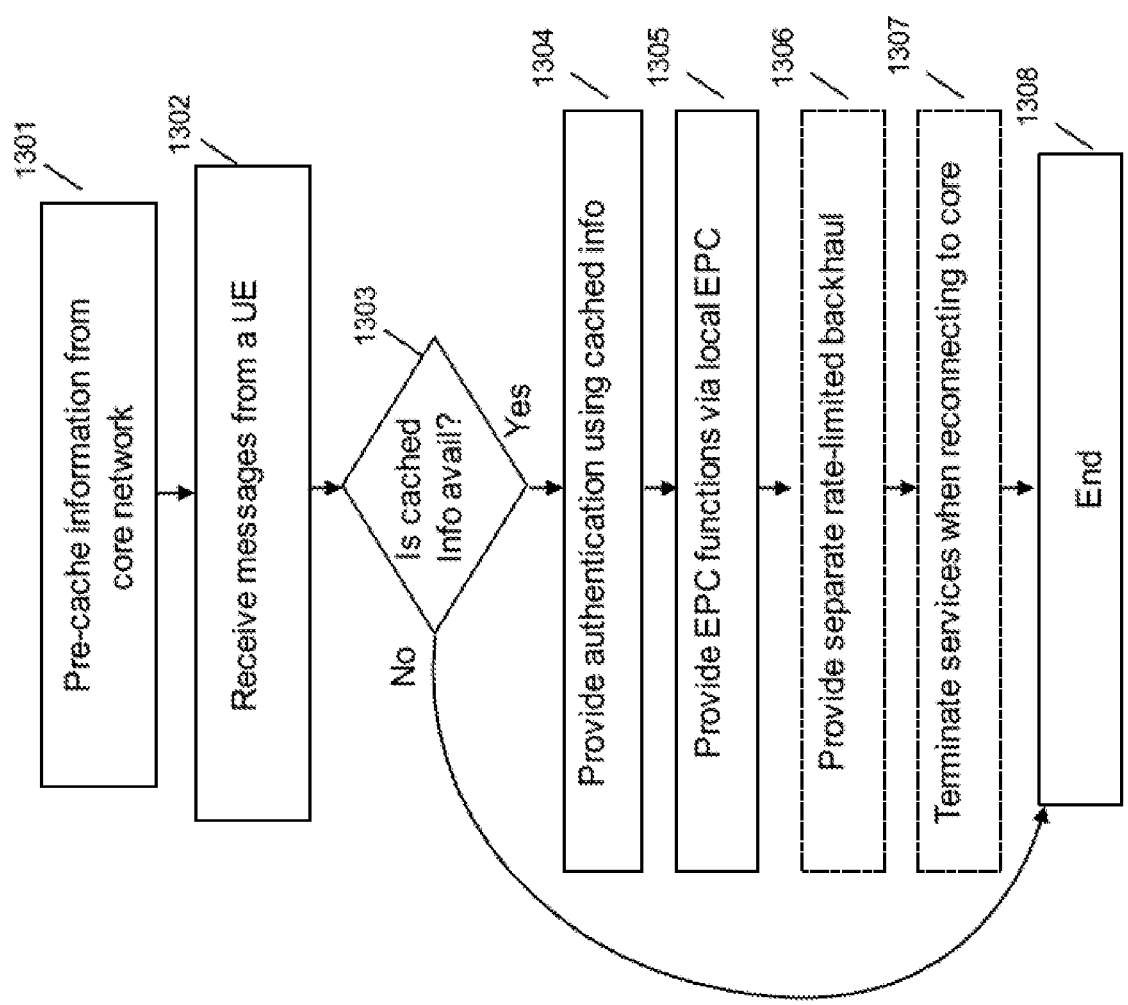
FIG. 13 is a flowchart of a method for providing limited services during a throttling mode, in accordance with some embodiments.

FIG. 13 is a flowchart of a method for providing limited services during a throttling mode, in accordance with some embodiments. At step 1301, information may be pre-cached from the core network at a gateway node to reduce the likelihood of a service interruption during congested periods. Specifically, the core network may be requested to provide a list of IMEIs or IMSIs that may connect to this core network node, and for each UE on the list of IMEIs or IMSIs, the core network may be requested to provide authentication information, such as is typically provided upon an attach request by a home subscriber server (HSS) and/or an authentication, authorization and accounting server (AAA) in the core network, including but not limited to security keys. The gateway node may maintain this list periodically over time.

At step 1302, a message may be received from a user equipment or other mobile device while the core network is unavailable or in a congestion state. The message may be an attach request, or which may be a request for data along a preexisting data bearer. In the case that a core network node becomes congested, requests for services by a UE may be redirected toward a local evolved packet core (EPC) and satisfied by the local EPC. However, services require authentication from the core network.

At step 1303, the received message may be inspected to identify the relevant identity information. For example, an attach request may include an IMSI, which may be used to authenticate the UE with the core network. If cached information previously obtained at step 1301 about the identity of the requesting UE is available at the gateway node, processing continues at step 1304. Otherwise, processing ends at step 1308.

At step 1304, the UE's identity information may be checked against the previously-cached authentication information. If the UE is authorized, processing continues to step 1305.

At step 1305, the message or request is handled by the local EPC. In some embodiments, a non-3GPP packet core, or a non-LTE (e.g., UMTS) packet core may also be supported by the local EPC. The message or request may be an attach request. In the case of an attach request, the local EPC may confirm attach to the UE without sending attach messages up to the core network. The message or request may be a request for user data, such as data from a remote network or the Internet. The local EPC may provide a packet gateway (PGW) interface to the UE with a connection to the Internet, such that the UE is able to complete its request for data without going through the core network. In some cases, such as with a secure tunnel between a UE and a remote network node, it may not be possible for the local EPC to provide data along the existing tunnel. In such cases, the local EPC may send a message to the UE terminating the existing tunnel, which may cause the UE to establish a new tunnel via the local EPC with connectivity.

At step 1306, if the UE requests data from a remote packet network, such as the Internet, the local EPC may provide a separate backhaul connection, i.e., separate from the connection to the core network. This connection may be secured via a tunnel to the operator's core network, or it may be unsecured. This connection may be a physically distinct backhaul connection. This connection may be rate-limited, throttled, or traffic-shaped. This connection may have less bandwidth than the normal backhaul connection, and may be shared with other base stations, gateways, or mobile devices. This connection may be lacking accounting services (i.e., data usage tracking), lawful intercept, or other services that are typically provided by the connection to the core network.

In some embodiments, no backhaul may be provided, and only requests and messages that are directed toward core network nodes may be serviced. For example, a mobile device may be able to attach to the local EPC, but may not be able to send or receive data to or from any network. Even without a backhaul connection, providing an attach point may provide advantages. For example, the user's mobile device may be able to enter into a reduced power mode over not being able to attach at all.

At step 1307, when the core network or core network nodes exits its congestion state, the services established with the local EPC may be terminated by the local EPC and the UEs may be encouraged thereby to reconnect to the rest of the core network.

The steps and methods described in FIG. 13 apply to any situation where a core network node is overloaded. For example, these steps may be performed in place of, or in conjunction with, step 1005 ("stop forwarding attach requests"), step 1108 ("drop requests"), or step 1206 ("reject request"). Using a local EPC to service some data requests along a throttled backhaul connection may provide some connectivity to UEs while the core network is in a congested state.

Figure 14:
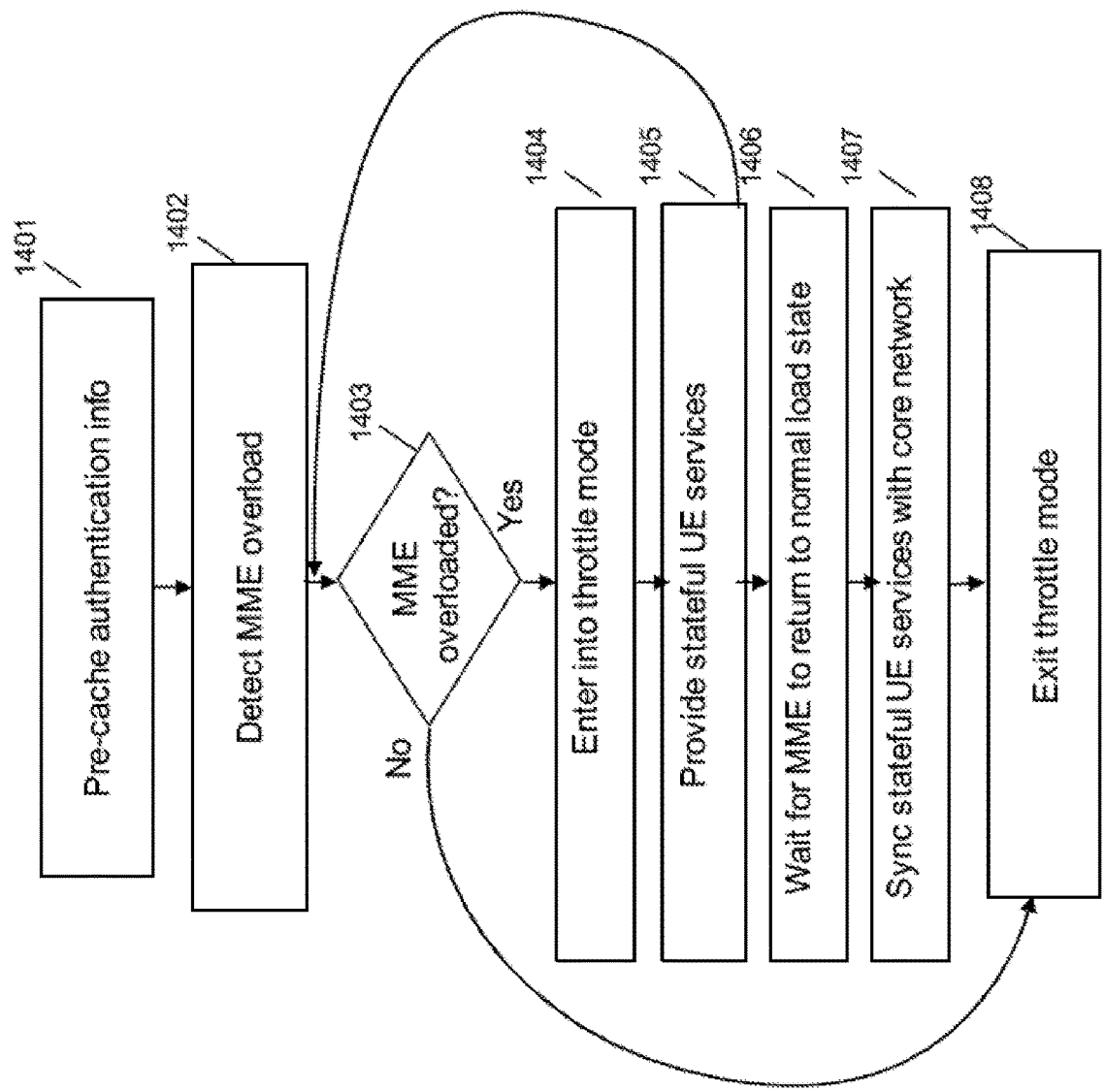
FIG. 14 is a flowchart of a method for providing stateful services with a core network, in accordance with some embodiments.

FIG. 14 is a flowchart of a method for providing stateful services with a core network, in accordance with some embodiments. Stateful services may include any services provided to a mobile device or UE that requires some state in the core network to be maintained, such as any attach services. At step 1401, authentication information may be pre-cached from the core network, including from an HSS or AAA, as described above at step 1301 of FIG. 13. At step 1402, overload of a core network MME may be detected, or overload of another core network node as appropriate, as described above with relation to FIG. 10. At step 1403, if the MME is overloaded, throttle mode is entered at step 1404, or if the MME is not overloaded and throttle mode is active, throttle mode is exited at step 1408.

At step 1405, once in throttle mode, stateful UE services may be provided in conjunction with a local EPC. For example, an attach may be performed by a UE in conjunction with a local MME. State for the attach may be maintained at the local MME. At step 1406, the core network MME or other core network may be determined to have returned to a normal load state. At step 1407, services may be transitioned over to the core network from the local EPC. If data for these services may be synchronized to maintain the service in an active state, such as the attach with the local MME, data may be synchronized to various degrees. For example, an MME proxy in the local EPC may initiate an attach at the present time to establish the UE connection to the core network MME. New bearers may be established by the core network MME. Other services may be synchronized, or if not able to be synchronized, they may be dropped. At step 1408, the gateway may exit the throttle mode.

In some embodiments, for a configured set of priority users, no authentication or minimal authentication may be used. This may be appropriate for emergency services personnel such as firefighters. In some embodiments, 2G/3G support may be added, by, for example, supporting Iuh signaling to a SGSN as well as requests to an MME.

In some embodiments, where the use of queueing or delay is described, the methods described in FIGS. 9-14 may be used instead.

In some embodiments, one or more signaling concentrators and/or gateway nodes may be used wherever one is specified above. Coordination between the concentrators may not be necessary.

Figure 15:
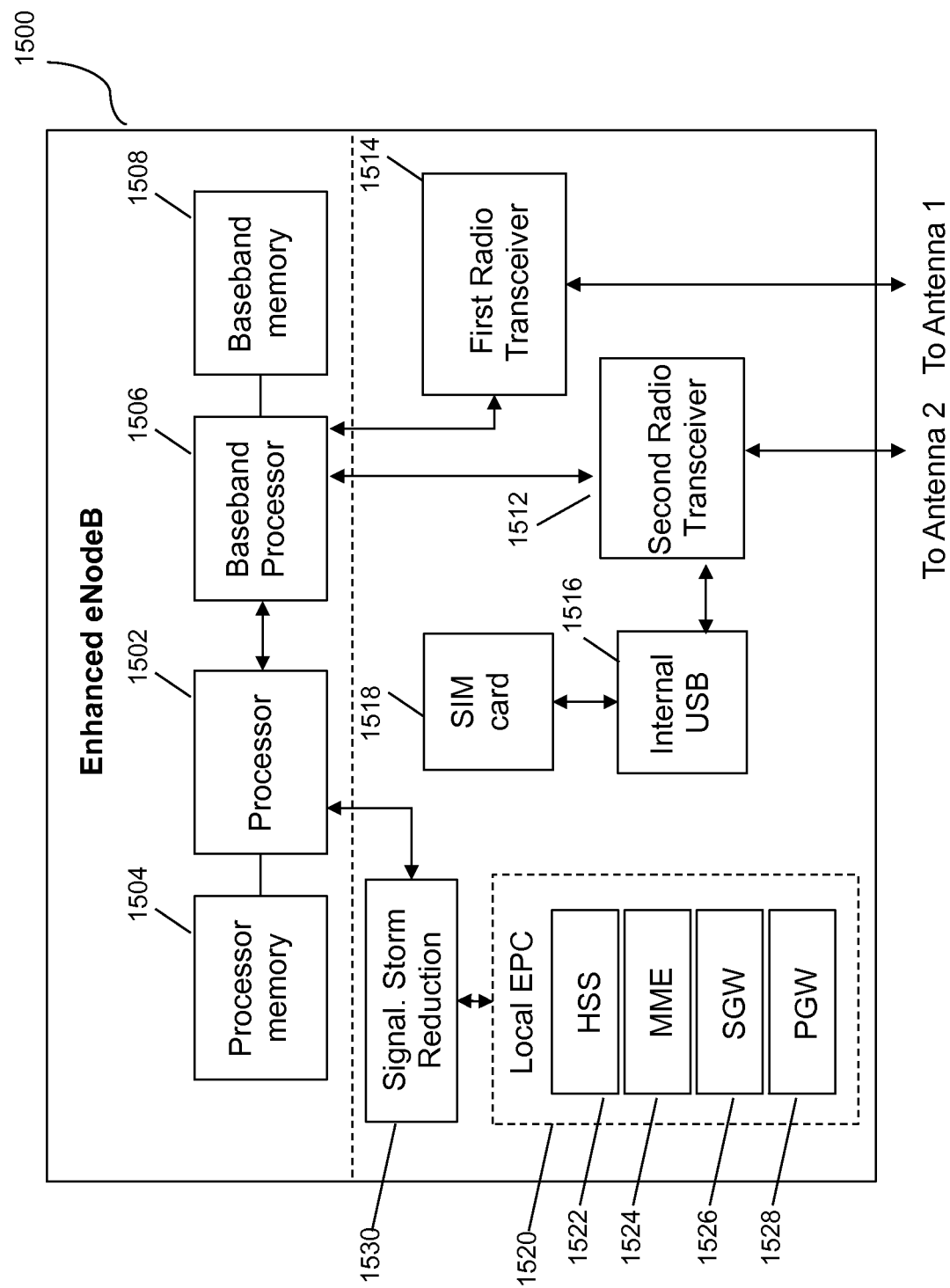
FIG. 15 is a schematic diagram of an enhanced eNodeB, in accordance with some embodiments.

FIG. 15 is a schematic diagram of an enhanced eNodeB, in accordance with some embodiments. Enhanced eNodeB 1500 may include processor 1502, processor memory 1504 in communication with the processor, baseband processor 1506, and baseband processor memory 1508 in communication with the baseband processor. Enhanced eNodeB 1500 may also include first radio transceiver 1510 and second radio transceiver 1512, internal universal serial bus (USB) port 1516, and subscriber information module card (SIM card) 1518 coupled to USB port 1514. In some embodiments, the second radio transceiver 1512 itself may be coupled to USB port 1516, and communications from the baseband processor may be passed through USB port 1516.

A signaling storm reduction module 1530 may also be included, and may be in communication with a local evolved packet core (EPC) module 1520, for authenticating users, storing and caching priority profile information, and performing other EPC-dependent functions when no backhaul link is available. Local EPC 1520 may include local HSS 1522, local MME 1524, local SGW 1526, and local PGW 1528, as well as other modules. Local EPC 1520 may incorporate these modules as software modules, processes, or containers. Local EPC 1520 may alternatively incorporate these modules as a small number of monolithic software processes. SSR module 1530 and local EPC 1520 may each run on processor 1502 or on another processor, or may be located within another device.

Processor 1502 and baseband processor 1506 are in communication with one another. Processor 1502 may perform routing functions, and may determine if/when a switch in network configuration is needed. Baseband processor 1506 may generate and receive radio signals for both radio transceivers 1510 and 1512, based on instructions from processor 1502. In some embodiments, processors 1502 and 1506 may be on the same physical logic board. In other embodiments, they may be on separate logic boards.

The first radio transceiver 1510 may be a radio transceiver capable of providing LTE eNodeB functionality, and may be capable of higher power and multi-channel OFDMA. The second radio transceiver 1512 may be a radio transceiver capable of providing LTE UE functionality. Both transceivers 1510 and 1512 are capable of receiving and transmitting on one or more LTE bands. In some embodiments, either or both of transceivers 1510 and 1512 may be capable of providing both LTE eNodeB and LTE UE functionality. Transceiver 1510 may be coupled to processor 1502 via a Peripheral Component Interconnect-Express (PCI-E) bus, and/or via a daughtercard. As transceiver 1512 is for providing LTE UE functionality, in effect emulating a user equipment, it may be connected via the same or different PCI-E bus, or by a USB bus, and may also be coupled to SIM card 1518.

SIM card 1518 may provide information required for authenticating the simulated UE to the evolved packet core (EPC). When no access to an operator EPC is available, local EPC 1520 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1500 is not an ordinary UE but instead is a special UE for providing backhaul to device 1500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1510 and 1512, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 1502 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 1502 may identify the appropriate network configuration, and may perform routing of packets from one network interface to another accordingly. Processor 1502 may use memory 1504, in particular to store a routing table to be used for routing packets. Baseband processor 1506 may perform operations to generate the radio frequency signals for transmission or retransmission by both transceivers 1510 and 1512. Baseband processor 1506 may also perform operations to decode signals received by transceivers 1510 and 1512. Baseband processor 1506 may use memory 1508 to perform these tasks.

Figure 16:
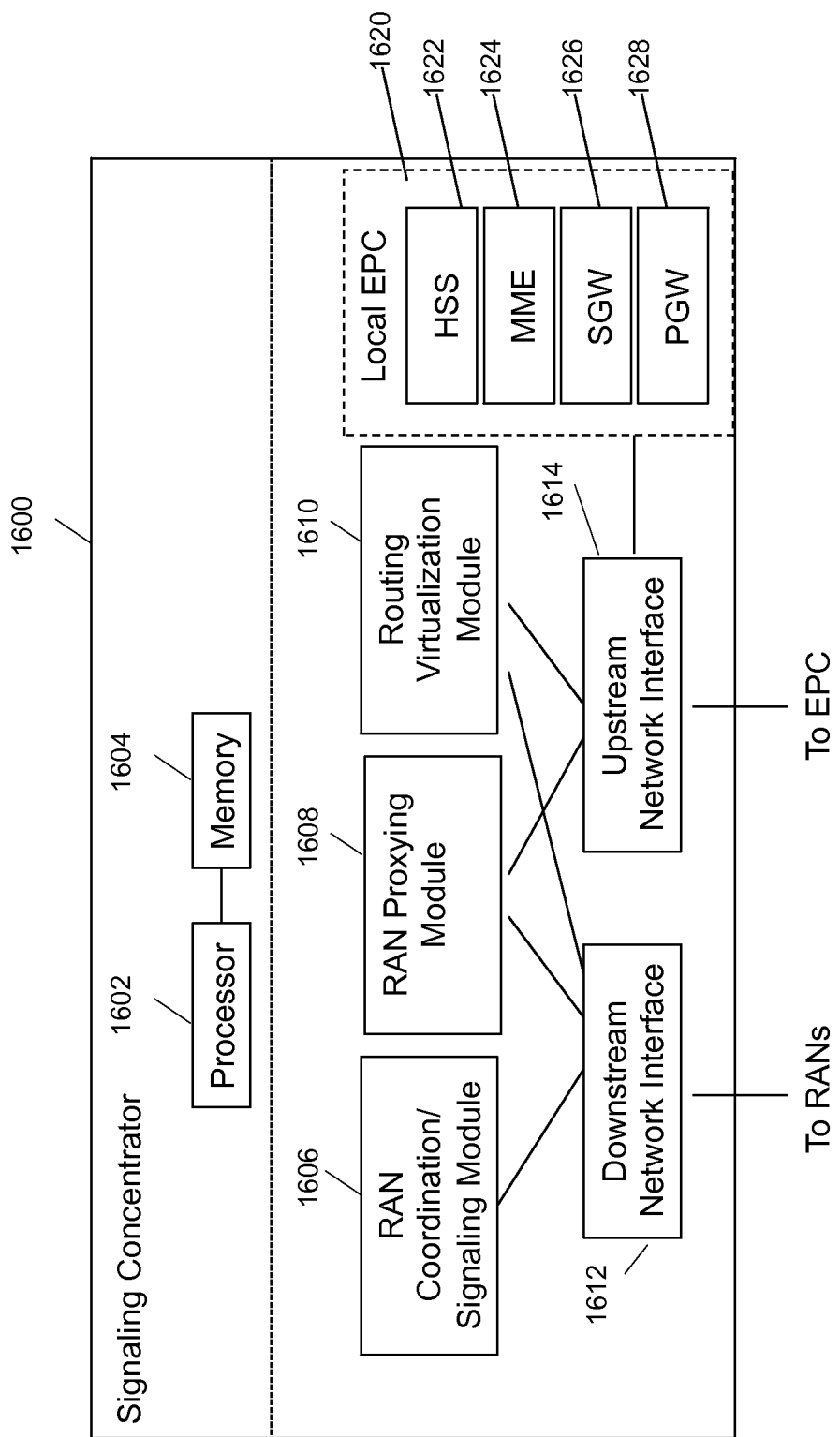
FIG. 16 is a schematic diagram of a signaling concentrator server, in accordance with some embodiments.

FIG. 16 is a schematic diagram of a signaling concentrator server, in accordance with some embodiments. Signaling concentrator 1600 includes processor 1602 and memory 1604, which are configured to provide the functions described herein. Also present are radio access network coordination/signaling (RAN Coordination and signaling) module 1606, RAN proxying module 1608, and routing virtualization module 1610. In some embodiments, concentrator server 1600 may coordinate multiple RANs using coordination module 1606. In some embodiments, coordination server may also provide proxying, routing virtualization and RAN virtualization, via modules 1610 and 1608. In some embodiments, a downstream network interface 1612 is provided for interfacing with the RANs, which may be a radio interface (e.g., LTE), and an upstream network interface 1614 is provided for interfacing with the core network, which may be either a radio interface (e.g., LTE) or a wired interface (e.g., Ethernet). Signaling storm reduction functions may be performed in module 1606.

Signaling concentrator 1600 includes local evolved packet core (EPC) module 1620, for authenticating users, storing and caching priority profile information, and performing other EPC-dependent functions when no backhaul link is available. Local EPC 1620 may include local HSS 1622, local MME 1624, local SGW 1626, and local PGW 1628, as well as other modules. Local EPC 1620 may incorporate these modules as software modules, processes, or containers. Local EPC 1620 may alternatively incorporate these modules as a small number of monolithic software processes. Modules 1606, 1608, 1610 and local EPC 1620 may each run on processor 1602 or on another processor, or may be located within another device.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to Wi-Fi networks, networks in an unlicensed band, including 3GPP networks (LTE-U/LTE-AA), or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Accordingly, the disclosure of the present invention is intended to be illustrative of, but not limiting of, the scope of the invention, which is specified in the following claims.

The invention claimed is:

1. A method, comprising:
   determining, at a signaling node in communication with a radio access network providing access to and with a core network, an elevated load state for a core network node based on a count of messages received during a first interval at a base station for a plurality of user equipments (UEs);
   retaining, at the signaling node, state of at least one UE of the plurality of UEs and of the core network management server for a stateful filtering process configured to identify spurious signaling messages from the at least one UE during the elevated load state of the core network node;
   caching, at the signaling node, prioritization policies pertaining to the at least one UE;
   receiving, at the signaling node, a request from the at least one UE for services at the core network node;
   throttling or dropping the request based on a throttle mode based on the elevated load state and the retained state; and
   monitoring, at the signaling node, the load state of the core network node to determine when the core network node exits the throttle mode.

2. The method of claim 1, wherein the request is an attach request from a user equipment (UE) to connect to a mobility management entity (MME) in a long term evolution (LTE) core network, and the core network node is the MME.

3. The method of claim 1, further comprising entering the throttle mode when the load state exceeds a threshold set based on a line rate of a communications channel between the base station and the core network node or processing throughput estimate at the core network node.

4. The method of claim 1, further comprising entering or exiting the throttle mode upon receiving a S1AP overload control message from the core network node.

5. The method of claim 1, wherein the count of messages is an overall received message count from the plurality of UEs of messages that are being sent to the core network node.

6. The method of claim 1, wherein the count of messages is a count of success messages from the core network node to the radio access network.

7. The method of claim 1, wherein throttling further comprises sending, to the at least one UE, a rejection message and a request to reattempt after a configurable time period.

8. The method of claim 1, further comprising determining whether to drop, provide service to, or provide degraded service to the request.

9. The method of claim 1, further comprising determining at the base station whether to send the at least one UE to another radio access network node or radio access technology.

10. The method of claim 1, wherein the base station is a multi-radio access technology (multi-RAT) base station and provides radio access according to at least two of 2G, 3G, 4G, 5G, Wi-Fi or WiMax protocol.

11. The method of claim 1, further comprising:
receiving, at the signaling node, authentication information from a security server in the core network;
caching authentication information; and
authenticating the at least one UE prior to providing access to core network devices.

12. The method of claim 1, further comprising entering the throttle mode based on the load state and a priority of the request.

13. The method of claim 1, further comprising entering the throttle mode based on the load state and a source equipment identifier of the at least one UE in the request.

14. The method of claim 13, wherein the source equipment identifier is either an international mobile subscriber identity (IMSI) or international mobile equipment identifier (IMEI) on a priority equipment list or in a range of priority equipment identifiers.

15. The method of claim 1, further comprising entering the throttle mode based on the load state and a roaming status of the at least one UE.

16. The method of claim 1, wherein the stateful filtering process performs filtering using a combination of two or more of: international mobile equipment identifier (IMEI), international mobile subscriber identity (IMSI), IP address, IP port, protocol type, security status, encryption status, general packet radio service tunneling protocol (GTP) tunnel status.

17. The method of claim 1, further comprising detecting a rogue UE or a rogue application, and rejecting messages from the rogue UE or the rogue application via the stateful filtering process.

18. The method of claim 1, where in the plurality of UEs include mobile devices, machine to machine (M2M) devices, Internet of Things (IoT) devices.

19. The method of claim 1, further comprising performing second stage filtering at a coordinating node situated between the base station and the core network node.

* * * * *